United States Patent
Kumaido et al.

(10) Patent No.: US 7,559,405 B2
(45) Date of Patent: Jul. 14, 2009

(54) CONTROLLER FOR ELECTRIC POWER STEERING DEVICE

(75) Inventors: Kazuhiro Kumaido, Gunma (JP); Yusuke Itakura, Gunma (JP); Yuho Aoki, Gunma (JP); Nobuhiro Kubo, Gunma (JP)

(73) Assignees: NSK Ltd., Tokyo (JP); NSK Steering Systems Co., Ltd., Tokyo (JP)

( * ) Notice: Subject to any disclaimer, the term of this patent is extended or adjusted under 35 U.S.C. 154(b) by 303 days.

(21) Appl. No.: 10/569,625

(22) PCT Filed: Aug. 26, 2004

(86) PCT No.: PCT/JP2004/012695

§ 371 (c)(1),
(2), (4) Date: Feb. 27, 2006

(87) PCT Pub. No.: WO2005/021359

PCT Pub. Date: Mar. 10, 2005

(65) Prior Publication Data

US 2007/0000717 A1    Jan. 4, 2007

(30) Foreign Application Priority Data

Aug. 28, 2003 (JP) ............................. 2003-304595
Jan. 23, 2004 (JP) ............................. 2004-015816
Feb. 19, 2004 (JP) ............................. 2004-042512

(51) Int. Cl.
*B62D 5/04* (2006.01)
(52) U.S. Cl. .................... 180/446; 180/405; 701/43
(58) Field of Classification Search ............... 180/443, 180/446
See application file for complete search history.

(56) References Cited

U.S. PATENT DOCUMENTS

| 5,600,559 A | * | 2/1997 | Nishimoto et al. | ............ 701/41 |
| 5,720,361 A | * | 2/1998 | Nishimoto et al. | .......... 180/446 |
| 6,704,665 B2 | * | 3/2004 | Ueno | .......................... 702/41 |

FOREIGN PATENT DOCUMENTS

| JP | 02-133281 A | 5/1990 |
| JP | 2000-318633 A | 11/2000 |
| JP | 2000-329628 A | 11/2000 |
| JP | 2002-127926 A | 5/2002 |
| JP | 2002-127927 A | 5/2002 |
| JP | 2003-11832 A | 1/2003 |
| JP | 2003-63433 A | 3/2003 |
| JP | 2003-170857 A | 6/2003 |
| JP | 2003-226250 A | 8/2003 |
| JP | 2004-196128 A | 7/2004 |

OTHER PUBLICATIONS

Machine translation of JP 2003-063433.*
Machine translation of JP 2004-196128.*

* cited by examiner

*Primary Examiner*—Kevin Hurley
(74) *Attorney, Agent, or Firm*—Sughrue Mion, PLLC

(57) ABSTRACT

The present invention provides a controller of an electric power steering device which does not apply an uncomfortable feeling to a operation of steering wheel while securing a fault determination confirming period enough long to prevent an erroneous detection of a torque sensor fault, and can secure a safety operation of steering wheel, even in the case that an output value of a torque sensor detecting a steering torque of a steering wheel becomes abnormal.

17 Claims, 20 Drawing Sheets

(A)  (B)

CONTROLLER FOR ELECTRIC POWER STEERING DEVICE

TECHNICAL FIELD

The present invention relates to a controller of an electric power steering device, and more particularly to a controller of an electric power steering device which can continue a control by using an substitute torque value in the case that a torque sensor gets into an abnormal state, and can securely detect a fault of the torque sensor.

BACKGROUND TECHNIQUE

An electric power steering device applying a steering assist force to a steering apparatus of a motor vehicle on the basis of a rotating force of a motor is constructed such as to apply the steering assist force to a steering shaft or a rack shaft by a transmission mechanism such as a gear or a belt or the like via a reduction gear on the basis of a driving force of the motor.

An example of construction of the electric power steering device mentioned above is shown in FIG. 1, and is described. A shaft 102 of a steering wheel 101 is coupled to a tie rod 106 of a running wheel via a reduction gear 103, universal joints 104a and 104b and a pinion rack mechanism 105. The shaft 102 is provided with a torque sensor 107 detecting a steering torque of the steering wheel 101, and a motor 108 assisting a steering force of the steering wheel 101 is coupled to the shaft 102 via the reduction gear 103. Further, a motor control of the electric power steering device is executed by a control unit 109 by setting a torque value detected by the torque sensor 107, a vehicle speed detected from a vehicle speed sensor (not shown), a rotation angle of the motor detected by a Hall sensor 110 or the like, and the like to input values. The control unit 109 is mainly constituted by a CPU, and a motor control is executed in an inner portion of the CPU in accordance with a program.

One example of a control system controlling the motor 108 of the electric power steering device mentioned above is shown in FIG. 2 and is described. In FIG. 2, a current command value calculating unit 120 calculates a current command value Iref by being input the torque value detected by the torque sensor 107, a difference from a detection value Im of the motor current is calculated by a subtraction unit 121, a duty ratio is determined by a current control unit 122, and a motor driving unit 123 executes a PWM control in accordance with the duty ratio so as to drive the motor 108.

In the electric power steering device mentioned above, on the assumption that the torque value detected by the torque sensor 107 is correctly detected, the control of the electric power steering device is executed. However, when the fault practically occurred in the torque sensor 107, and an abnormal torque detection value is input, there is a risk that an abnormal operation is caused with respect to the operation of steering wheel. Accordingly, various countermeasures have been conventionally employed.

For example, Japanese patent document 1 (Japanese Patent Application Laid-Open No. 2000-318633) employs a control method as shown in FIG. 3, and corresponds to an abnormality of the torque value output by the torque sensor. In other words, when the torque value output by the torque sensor becomes abnormal, and the abnormality continues for a predetermined time (tA), the control system interrupts a steering assist force command value corresponding to an output value of a current control calculation based on the torque value. In the case that the abnormality continues for a predetermined time (tB) which is longer than the predetermined time (tA), the control system interrupts a power source of motor driving.

FIG. 4 shows a relation between a torque value and a motor current in the case that the torque sensor causes an earth fault and the torque value corresponding to the output of the torque sensor becomes zero, in the control system mentioned above. In the case of the control system, since the steering assist command value is calculated on the basis of the output value of the torque sensor which becomes abnormal, for the predetermined time (tA), the steering assist force becomes abnormal, and the steering wheel performs a movement which is not intended by a driver. Further, if the abnormality continues for the predetermined time (tB) or more, the motor power source is interrupted. Accordingly, in the case that a great torque is applied to the steering wheel, the torque undesirably changes suddenly.

As the other countermeasure, there is a control system shown in Japanese patent document 2 (Japanese Patent Application Laid-Open No. 2000-329628). In accordance with the patent document 2, if a severe crucial abnormality such as a voltage drop, a short break or the like occurred in the power source of the torque sensor, a fail switch is disconnected, a torque value before the fail switch is disconnected is kept as the torque value corresponding to the output of the torque sensor, and the steering assist force command value is determined by multiplying the kept value by an output gain. Further, since the control system controls in such a manner as to gradually attenuate the subsequent steering assist force, the steering assist force does not change suddenly. FIG. 5 shows a relation between an output (a torque value) of the torque sensor and a motor current in the case that the torque sensor breaks down, for example, the torque sensor causes the earth fault, in the case of using the control system mentioned above. A negative maximum current flows through the motor until a determination of the fault is confirmed after the fault is caused, however, since the motor current is gradually reduced from the torque just before the fault is caused after the decision of the fault, the sudden torque change as described in the patent document 1 is not generated.

However, in the case that the earth fault is caused while the torque value causes a chattering as shown in FIG. 6, there is a possibility that a value shown by a black circle is sampled in the case of sampling the output value of the torque sensor by an AD converter. In the case mentioned above, the earth fault can not be detected until the sampling value shown by the black circle becomes equal to or less than a threshold value for detecting the earth fault, and the control is carried on as it is. Further, the motor current is gradually reduced from the torque value just before the fault is caused after the earth fault is detected. However, since the motor current is gradually reduced from the unstable torque value in which the chattering is caused, the reduction is undesirably started from an inverted torque to the torque just before the fault at the worst.

Further, in accordance with the method described in the patent document 2, since the abnormal current flows through the motor during the determining period until the determination of the fault is confirmed after the fault is caused, it is impossible to make the determining period of the fault determination too long. However, in order to prevent the fault detection from being erroneously executed so as to ensure the fault detection, it is antagonistically desirable to make the fault determination confirming time as long as possible, and a problem occurred.

There is a problem that the conventional control system controls on the basis of the abnormal torque value until the fault of the torque sensor is confirmed in the case that the torque value corresponding to the output of the torque sensor becomes abnormal, and the steering assist force becomes abnormal.

Further, even in the case that the substitute torque value is used in place of the abnormal torque value, there is a problem that an appropriate substitute torque value is not calculated. As a result, if the output of the torque sensor becomes abnormal, the steering wheel executes the movement which is not intended by the driver, so that there is a problem that an uncomfortable feeling of the operation of steering wheel is applied to the driver.

Further, since the abnormal current flows through the motor during the determining period until the determination of the fault is confirmed after the fault is caused, it is impossible to elongate the confirming time of the fault determination, so that there is a problem that an erroneous detection about the fault detection of the torque sensor is generated. Particularly, in the chattering phenomenon generated in the case that a wiring transmitting the torque value detected by the torque sensor is disconnected, there is a problem that it is hard to correctly control the torque of the electric power steering device.

The present invention is made by taking the circumstances mentioned above into consideration, and a first object of the present invention is to provide a controller of an electric power steering device which does not apply an uncomfortable feeling to a operation of steering wheel while securing a fault determination confirming period enough long to prevent an erroneous detection of a torque sensor fault, and can secure a safety operation of steering wheel, even in the case that an output value of a torque sensor becomes abnormal.

Further, a second object of the present invention is to provide a controller of an electric power steering device which can safely switch an output value of a torque sensor and an substitute torque value used at an abnormal time even in the case that a plurality of torque abnormality detecting means are provided.

Further, a third object of the present invention is to provide a controller of an electric power steering device which can precisely estimate an substitute torque value used for a control during an abnormal period of the torque sensor.

DISCLOSURE OF THE INVENTION

The present invention relates to a controller of an electric power steering device which comprising a motor applying a steering assist force to a steering system of a vehicle and a torque sensor detecting a steering force applied to a steering wheel, and controlling said motor based on an output value of said torque sensor.

The object mentioned above of the present invention is achieved by using a controller which comprises a torque abnormality detecting means for detecting an abnormally of said torque sensor and an substitute torque value calculating means for calculating an substitute torque value in case that said torque abnormality detecting means detects said abnormality, and controls said motor based on said substitute torque value in case that said abnormality of said torque sensor is detected.

The object mentioned above of the present invention is achieved by using a controller which comprises a torque input processing unit comprising at least one torque abnormality detecting means for detecting an abnormally of an output value of said torque sensor and an substitute torque value calculating means for calculating an substitute torque value based on past normal output value of said torque sensor before said output value of said torque sensor becomes abnormal, and controls said motor based on said substitute torque value in place of said output value of said torque sensor, in case that said output value of said torque sensor is abnormal.

Further, the object mentioned above is achieved by using a controller which comprises a torque fault confirming means for confirming a determination that said torque sensor is out of order in the case that said abnormality of said output value of said torque sensor runs on for a fixed time, and controls said motor based of said substitute torque value in place of said output value of said torque sensor in case that said output value of said torque sensor is abnormal, even before confirming said determination that said torque sensor is out of order.

The object mentioned above of the present invention is achieved by using a controller which comprises a plurality of torque abnormality detecting means for detecting an abnormality of said torque sensor based on said output value of said torque sensor, and an substitute torque value calculating means for calculating an substitute torque value based on past normal output value of said torque sensor before said output value of said torque sensor becomes abnormal, controls said motor based on said substitute torque value in place of said output value of said torque sensor at a time of determining that any one of said plurality of torque abnormality detecting means is abnormal, and in the case of controlling said motor based on said substitute torque value, controls by using said output value of said torque sensor in place of said substitute torque value at a time of determining that all of said plurality of torque abnormality detecting means are normal.

The object mentioned above of the present invention is achieved by comprising a plurality of torque abnormality detecting means for detecting said abnormality of said torque sensor based on said output value of said torque sensor, and confirming a determination that said torque sensor is out of order, in case that a period for determining that any one of said plurality of torque abnormality detecting means is continuously out of order by itself is over a predetermined time T1.

The object mentioned above of the present invention is achieved by comprising a plurality of torque abnormality detecting means for detecting said abnormality of said torque sensor based on said output value of said torque sensor, and confirming a determination that said torque sensor is out of order, in case that a period for determining that at least one of said plurality of torque abnormality detecting means is out of order is continuously over a predetermined time T3.

The object mentioned above of the present invention is achieved by using a controller which comprises a main torque detecting means for detecting a main torque detection value Tm based on said output of said torque sensor; a sub torque detecting means for detecting a sub torque detection value Ts based on said output of said torque sensor; a torque abnormality detecting means for detecting an abnormality of said main torque detection value Tm or said sub torque detection value Ts; and an substitute torque value calculating means for calculating an substitute torque value Ta based on past normal main torque detection value Tm before said main torque detection value Tm or said sub torque detection value Ts becomes abnormal and past normal sub torque detection value Ts before said main torque detection value Tm or said sub torque detection value Ts becomes abnormal, and controls said motor based on said substitute torque value Ta in place of said main torque detection value Tm, in case that said main torque detection value Tm or said sub torque detection value Ts is detected to be abnormal.

BEST MODE FOR CARRYING OUT THE INVENTION

A description will be in detail given below of a preferable embodiment in accordance with the present invention with reference to the accompanying drawings.

Figure 7:
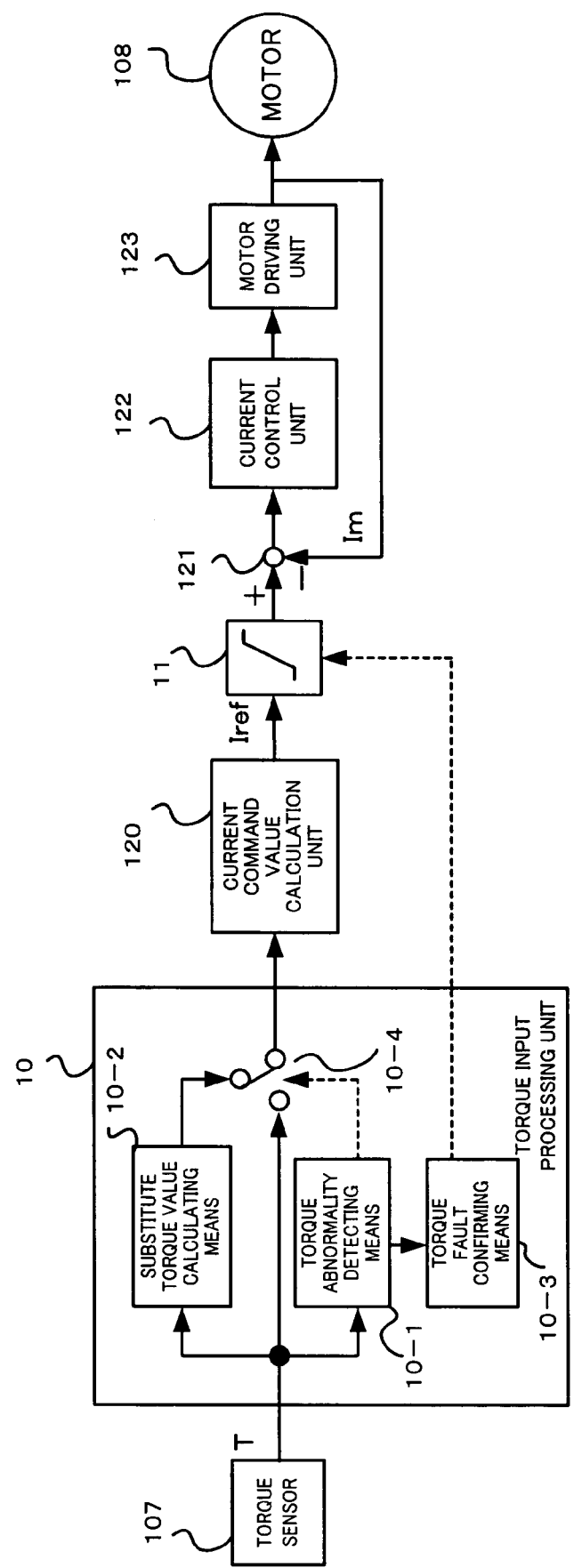
FIG. 7 is a control block diagram showing a first embodiment in accordance with the present invention.

FIG. 7 is a control block diagram showing a first embodiment in accordance with the present invention. A torque value detected by a torque sensor 107 is input to a torque input processing unit 10 without being directly input to a current command value calculation unit 120, and an output value thereof is input to the current command value calculation unit 120. The current command value calculation unit 120 calculates a current command value Iref, calculates a difference from a detection value Im of a motor current by a subtraction unit 121, and determines a duty ratio by a current control unit 122, and a motor driving unit 123 executes a PWM control in accordance with the duty ratio so as to drive the motor 108.

The torque input processing unit 10 operates in such a manner that in the case that a torque value output by a torque sensor 107 is normal, the torque value is input to the current command value calculation unit 120. Further, the torque input processing unit 10 calculates an substitute torque value in the case that the torque value is abnormal, and inputs the substitute torque value to the current command value calculation unit 120.

The torque input processing unit 10 is constituted by a torque abnormality detecting means 10-1, an substitute torque value calculating means 10-2, a torque fault confirming means 10-3, and a selection switch 10-4. The torque fault confirming means 10-3 regards a fault in the case that the output value of the torque sensor 107 becomes abnormal, and the abnormality runs on for a fixed time. A limiter 11 provided in a rear stage of the current command value calculation unit 120 has a function of narrowing down a limiter value for reducing the motor current step by step (a gradually decreasing process) in case that the torque fault confirming means 10-3 confirms the determination of fault. In this case, the torque fault confirming means 10-3 is not necessarily incorporated in the torque input processing unit 10. In the present embodiment, since an output result of the torque abnormality detecting means 10-1 is utilized, the torque fault confirming means 10-3 is incorporated in the torque input processing unit 10. Further, a method of reducing the motor current step by step is not limited to the limiter 11. For example, if the construction is made such as to multiply the current command value Iref corresponding to the output of the current command value calculation unit 120 by again G, thereby reducing the gain G from 1 to 0, a value of G·Iref is reduced step by step toward 0 from the current command value Iref.

Figure 8:
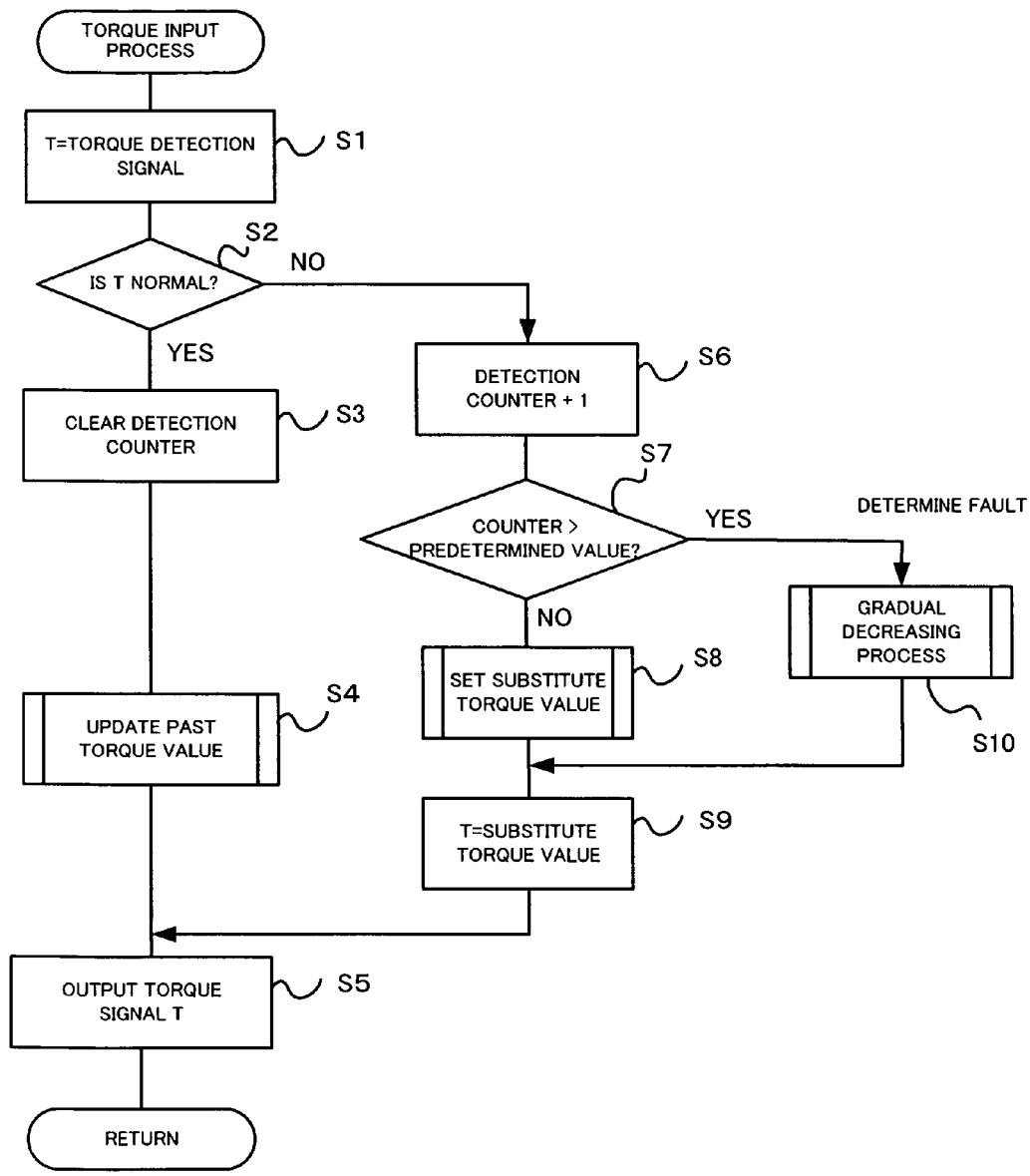
FIG. 8 is a flowchart showing an operation example of a torque input processing unit in accordance with the first embodiment.

A description will be given of an operation of the torque input processing unit 10 with reference to a flow chart in FIG. 8. A torque value T corresponding to the output value of the torque sensor 107 is read via an AD converter (not shown) (step S1). Next, it is determined whether the torque value T is normal or abnormal (step S2). A determination value Tref of normality and abnormality is variously considered, for example, a value equal to or more than a threshold value which can never generated in the normal torque value or equal to or less than the threshold value is set to be abnormal. Alternatively, in the case of discontinuously changing suddenly, the abnormality is determined. As the abnormality of the torque value, there can be considered an output voltage fixed to zero or a power source voltage, an offset abnormality (an abnormality (T+α) which is α biased), and a torque amplifier abnormality (an abnormality (K·T) in which an operational amplifier is out of order). If the torque value T is not abnormal, an abnormality detecting counter is cleared (step S3).

Figure 9:
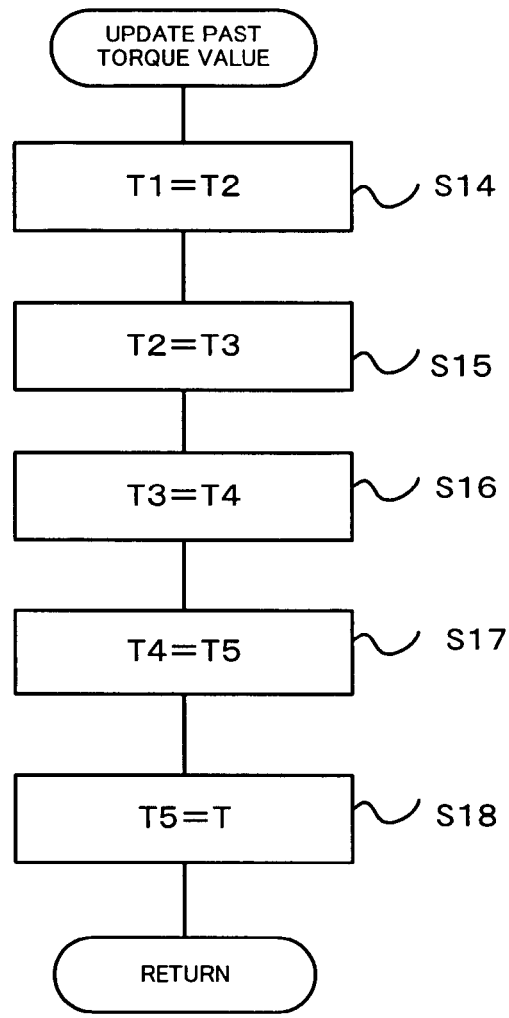
FIG. 9 is a flowchart showing an example of an updating operation of a past torque value.

The abnormality detecting counter is constructed such as to count in the case of detecting the abnormality of the torque value T, and does not immediately determine the fault of the torque counter only because the fault is once detected. As mentioned below, the determination that the torque sensor is out of order is confirmed only if the count number of the abnormality detecting counter is over the predetermined value. Next, the step calls an updating routine of the past torque value, and updates proximate n samples, for example, five sample values T1, T2, T3, T4 and T5 as shown in FIG. 9 (step S4). Further, since the torque value is not abnormal, the step calculates the torque value T by setting the torque value as the torque input processing unit 10 (step S5). Since the torque value T is not abnormal, the current command value calculation unit 120 calculates the current command value Iref on the basis of the torque value T in place of the substitute torque value.

On the other hand, if it is determined in the step S2 that the torque value T is abnormal, the abnormality detecting counter is counted up at one time (step S6). Next, the step determines whether or not a count value N of the abnormality detecting counter is larger than a predetermined value (step S7). Further, in the case that the count value N is larger than the predetermined value, the step determines the fault of the torque sensor 107. In the case that the count value N is equal to or less than the predetermined value, the step does not determine the fault of the torque sensor 107. However, since the torque value is abnormal, the torque value T can not be used for the current command value calculation unit 120 as the output value of the torque sensor 107. Accordingly, the substitute torque value is set in place of the torque value T (step S8).

Figure 10:
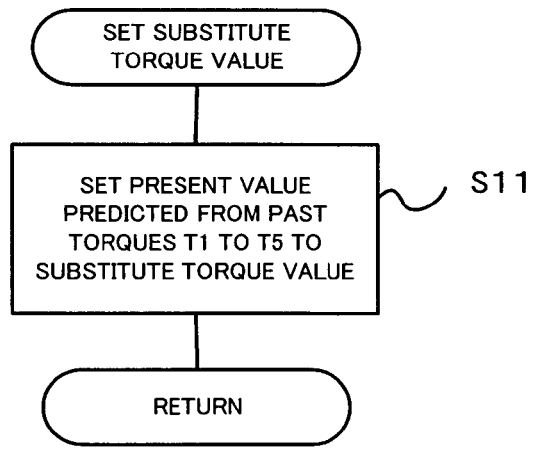
FIG. 10 is a flowchart showing an example of an operation of substituting a present value predicted from the past torque value as an substitute torque value.

In this case, it is necessary that the alternating torque value is a current normal torque value which is predicted from the past torque value, and there are some methods of calculating the substitute torque value. The substitute torque value is calculated by using n (natural number) samples of the past normal torque value. For example, as shown in FIG. 10, the predicted present value is determined on the basis of five samples of the past normal torque value, and is set to the substitute torque value (step S11). For example, the torque values T1, T2, T3, T4 and T5 of the past five samples are averaged, and an average value Tm=(T1+T2+T3+T4+T5)/5 is set to the substitute torque value. The other substitute torque value calculating methods will be in detail described later. In this case, it is mentioned that the past normal torque value is used, however, it is secured in the updating routine of the past torque value in the step S4 mentioned above.

The substitute torque value determined in the manner mentioned above is replaced as a substitute for the abnormal torque value (step S9). Further, in place of the output value of the torque sensor 107, the substitute torque value is input to the current command value calculation unit 120 (step S5).

The motor 108 is controlled by the substitute torque value, whereby it is possible to avoid the abnormality of the steering assist force generated in the case of being controlled by the abnormal torque value.

Further, one more important matter is to control by using the substitute torque value without using the abnormal torque value for the control even before the determination that the torque sensor 107 is out of order is confirmed. Since the control of the motor has been conventionally executed by substituting the substitute torque value after confirming the determination that the torque sensor is out of order, the control is executed on the basis of the abnormal torque value before confirming the determination of the fault, the abnormal steering assist force is generated, and an uncomfortable feeling is applied to the operation of steering wheel.

If the abnormality of the torque sensor 107 runs on, the torque value is determined to be abnormal (step S2), the abnormality detecting counter is counted, and the count value is increased (step S6). If the abnormality of the torque sensor further runs on, and the count value N of the abnormality detecting counter is over the predetermined value, the determination that the torque sensor 107 is out of order is confirmed (step S7). If the determination that the torque sensor is out of order is confirmed, a sudden change of the steering assist force is prevented by executing the control of decreasing the motor current step by step (step S10). As the method of attenuating the motor current step by step, the motor current may be attenuated step by step by arranging the limiter 11 in the output of the current command value calculation unit 120 while keeping the substitute torque value constant, and narrowing down the limiter value of the limiter 11 step by step, or the motor current may be attenuated step by step by decreasing the torque value of the substitute torque value step by step.

Figure 1:
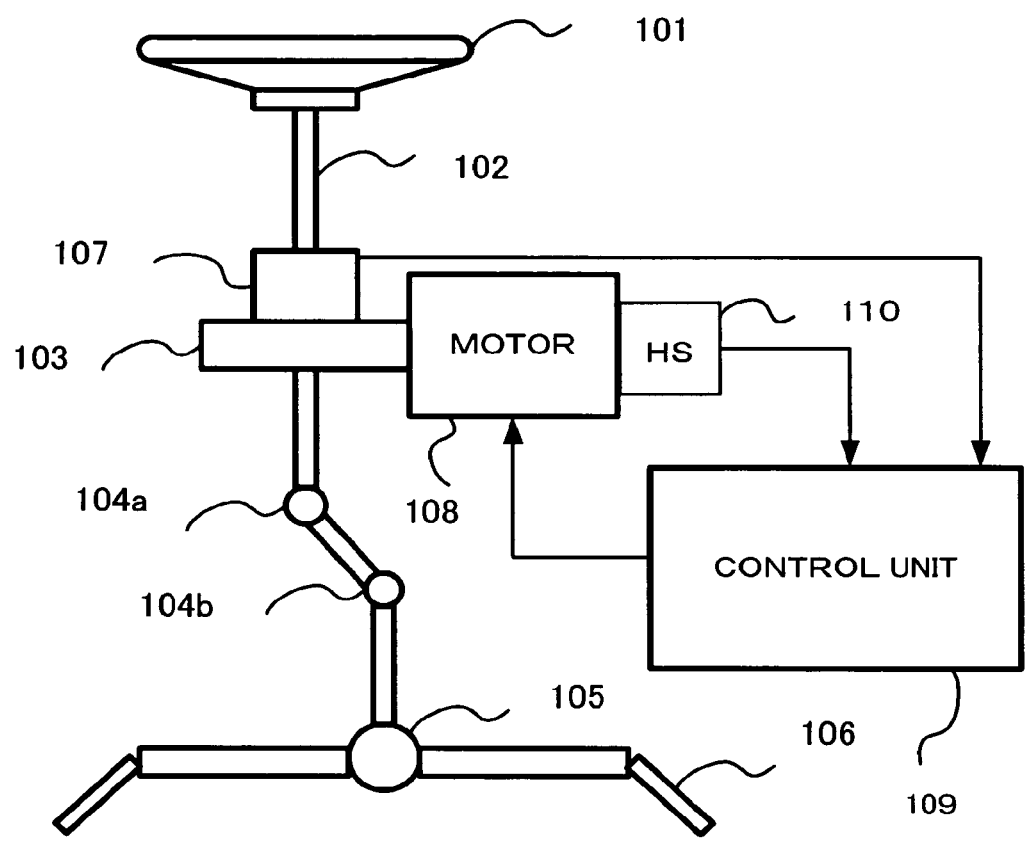
FIG. 1 is a schematic view of a general electric power steering device.
Figure 2:
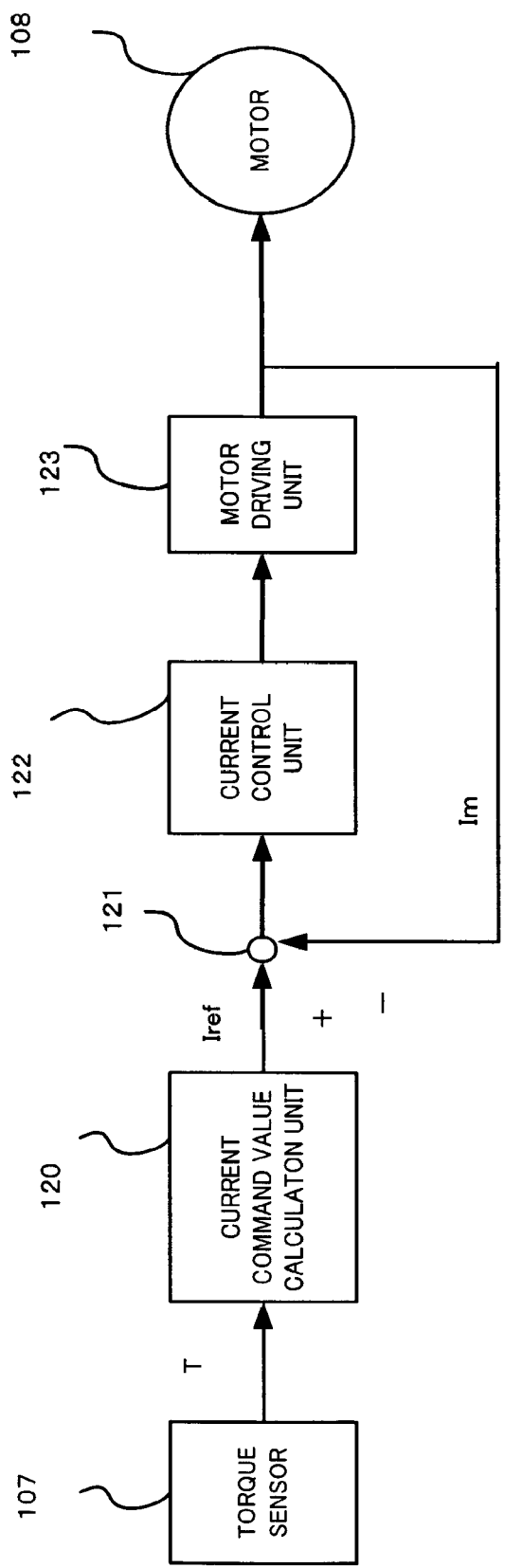
FIG. 2 is a block diagram showing an example of a control system of a conventional electric power steering device.
Figure 3:
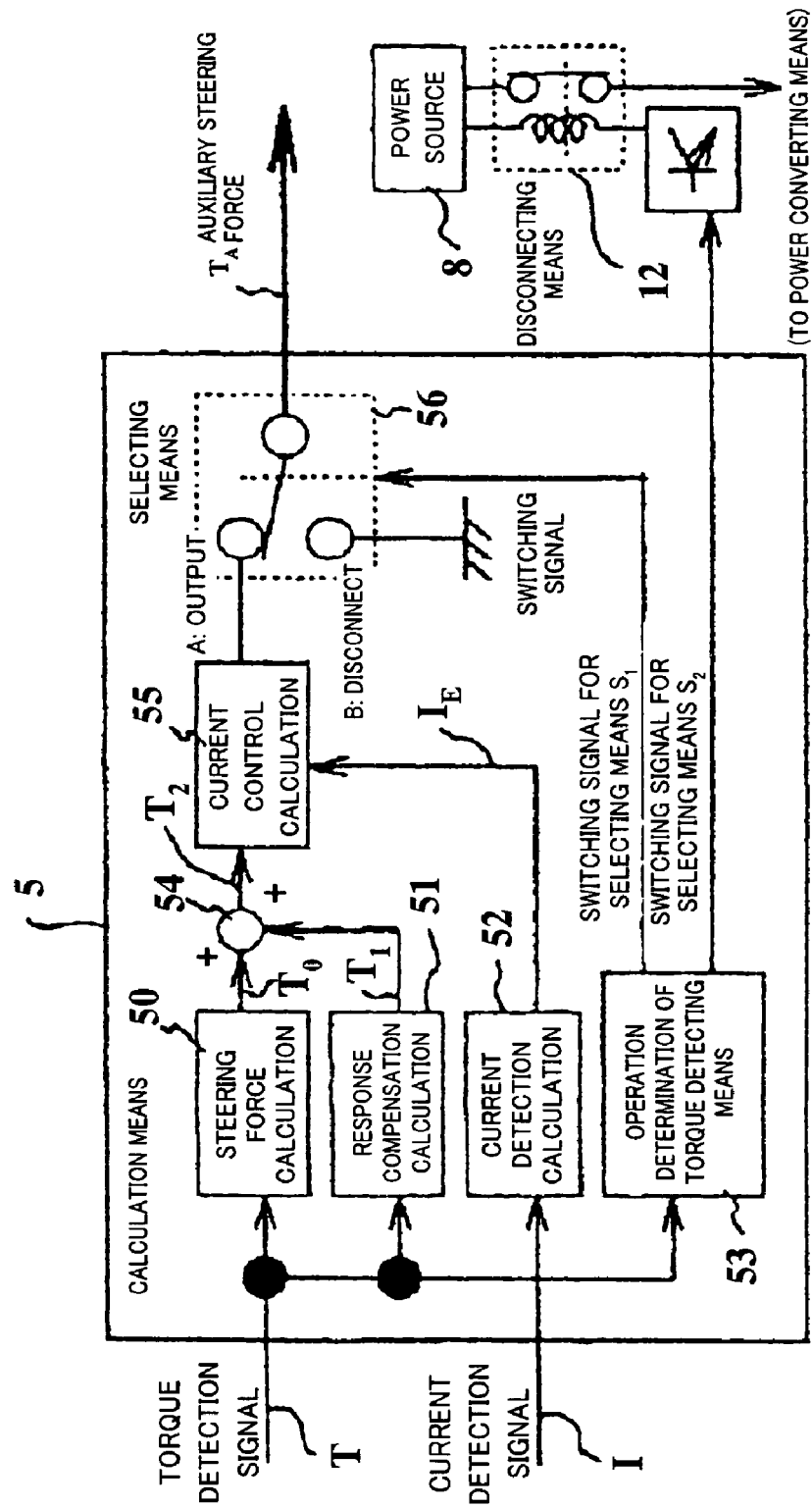
FIG. 3 is a block diagram showing an example of a conventional electric power steering device corresponding to an earth fault of a torque sensor.
Figure 4:
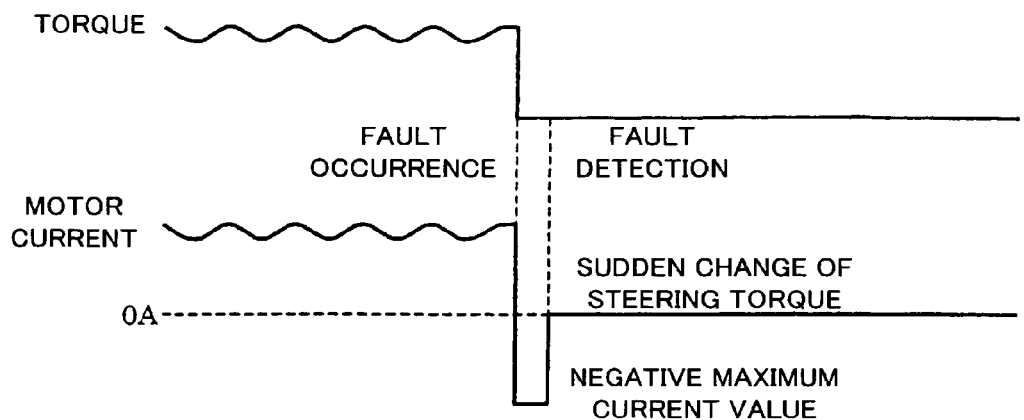
FIG. 4 is a view showing an example of an output result of a motor current at a time of the earth fault of the torque sensor.
Figure 5:
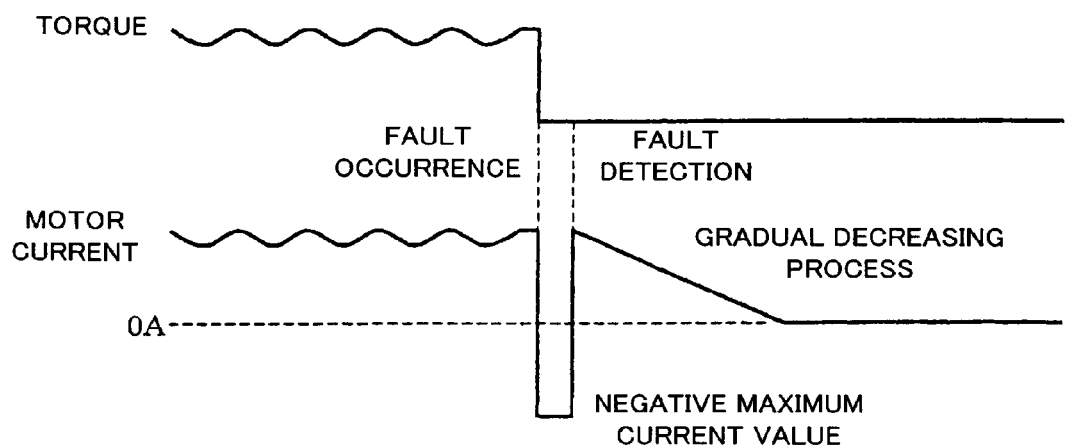
FIG. 5 is a view showing the other example of the output result of the motor current at a time of the earth fault of the torque sensor.
Figure 11:
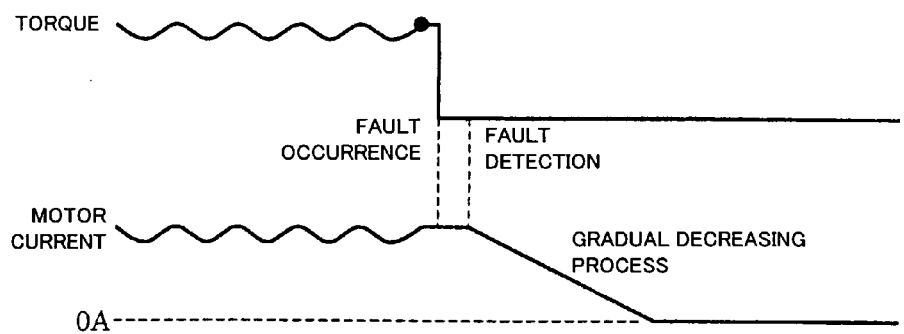
FIG. 11 is a view showing an example of an output result of a motor current in case that a torque sensor is under the earth fault, in a second embodiment in accordance with the present invention.

FIG. 11 is a view showing a relation between the torque value corresponding to the output of the torque sensor and the motor current in the case that the output value of the torque sensor 107 becomes suddenly zero, by using the torque input processing unit 10 in accordance with the present embodiment. Even if the torque value becomes suddenly zero, the substitute torque value is immediately used in place of the abnormal torque value. Accordingly, the motor current maintains the value just before the torque value becomes abnormal. Further, the motor current maintains the proximate value until confirming the determination that the torque sensor is out of order, and the motor current is attenuated step by step after the determination that the torque sensor is out of order is confirmed. Comparing with FIGS. 4 and 5 showing results in accordance with the conventional control method, the motor current does not become inverse to a polarity just before the torque value becomes abnormal, and no uncomfortable feeling is applied to the operation of steering wheel.

Figure 12:
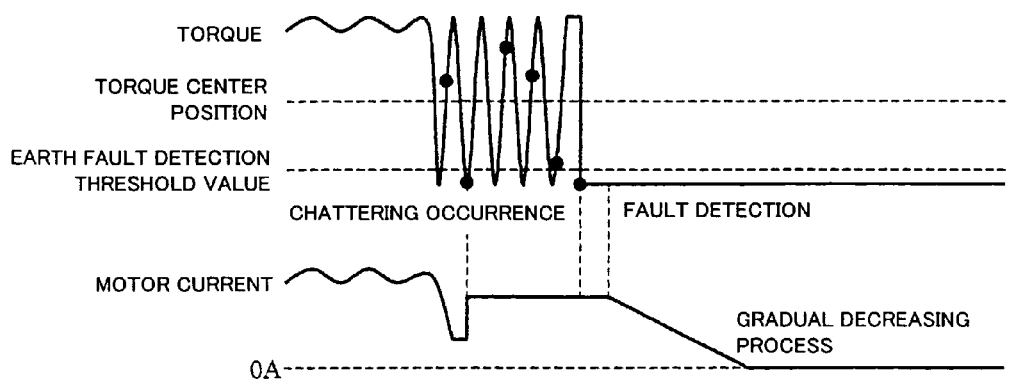
FIG. 12 is a view showing an example of an output result of a motor current at a fault time when the torque sensor causes a chattering fault, in the second embodiment in accordance with the present invention.

FIG. 12 shows a relation between the output torque value (the worst case) of the torque sensor and the motor current, in the case that the output value of the torque sensor 107 causes a chattering so as to be out of order, by using the torque input processing unit 10 in accordance with the present embodiment. If the torque value causes the chattering and the torque value is determined to be abnormal, the substitute torque value is calculated by using the past normal torque value, and the motor current is controlled on the basis of the substitute torque value. Accordingly, the motor current outputs a current which is not largely different from the motor current just before causing the chattering. Further, after confirming the determination of the fault, the motor current is attenuated step by step. The result is compared with FIG. 6 in accordance with the conventional control system. In the case of the conventional control system, there is obtained the result which is not preferable for the driver, such as the motor current having the inverse polarity to that before the torque sensor output becomes abnormal is generated, and violently fluctuates thereafter. Further, the motor current is preferably attenuated step by step after confirming the fault, however, since there is obtained a result that the motor current just before the attenuation is attenuated from the current having the inverse polarity, the construction is not preferable. However, in accordance with the present invention, even in the worst case, there is obtained the control which is apparently preferable for the steering of steering wheel in comparison with the conventional control system.

The embodiment mentioned above corresponds to a case that the substitute torque value employs a simple average of five past samples, however, there are additionally least mean square method, a method of calculating the present value by calculating an expression of degree (n−1) from the past n sample values, a weighted average method and the like as the calculating method of the substitute torque value, and a description will be given below of them.

Figure 13:
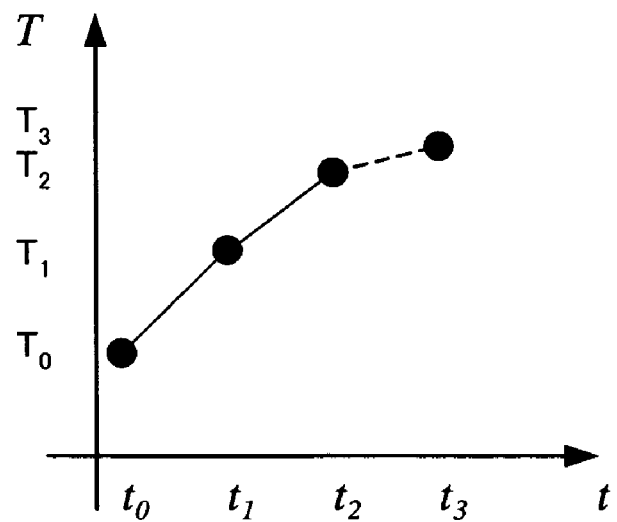
FIG. 13 is a view showing a principle of a current position estimation using an expression of degree n.

First, a description will be given of a method of calculating the substitute torque value by preparing the expression of degree (n−1) from the past n samples. For example, a quadratic expression is prepared from three past samples ($T_0$, $T_1$, $T_2$) as shown in FIG. 13, and the following calculation is executed for predicting the present value $T_3$.

$$T\,d = a \cdot t^2 + b \cdot t + c \qquad \text{[Expression 1]}$$

In the case of the expression 1, in order to calculate a, b and c, it is necessary to solve simultaneous equations presented by the following expression 2.

$$\begin{pmatrix} t_0^2 & t_0 & 1 \\ t_1^2 & t_1 & 1 \\ t_2^2 & t_2 & 1 \end{pmatrix} \begin{pmatrix} a \\ b \\ c \end{pmatrix} = \begin{pmatrix} T_0 \\ T_1 \\ T_2 \end{pmatrix} \qquad \text{[Expression 2]}$$

Accordingly, the present value $T_3$ is calculated as shown in the following expression 3.

$$T_3 = a \cdot t_3^2 + b \cdot t_3 + c \qquad \text{[Expression 3]}$$

$$= (t_3^2 \;\; t_3 \;\; 1) \begin{pmatrix} t_0^2 & t_0 & 1 \\ t_1^2 & t_1 & 1 \\ t_2^2 & t_2 & 1 \end{pmatrix}^{-1} \begin{pmatrix} T_0 \\ T_1 \\ T_2 \end{pmatrix}$$

In the actual calculation, it is possible to previously calculate an inverse matrix part. For example, the inverse matrix part in the case of the past three samples is as shown in the following expression 4.

$$T = (1 \;\; -3 \;\; 3) \begin{pmatrix} T_0 \\ T_1 \\ T_2 \end{pmatrix} \qquad \text{[Expression 4]}$$

Next, a description will be given of the calculating method of the substitute torque value using least mean square method. A linear expression is prepared in accordance with least mean square method from n samples directly attributing to the past torque value, and the substitute torque value is set by predicting the present value. In the case of the method of obtaining the substitute torque value mentioned above in accordance with the expression of degree n, since a noise is included in the past torque value, there is a case that an optimum present value can not be obtained by fitting exactly to the expression of degree n. Accordingly, each of the coefficients is calculated in accordance with least mean square method. For example, in the case that the present value is predicted by preparing the linear expression from three past samples, it is preferable to execute the following calculation.

Figure 14:
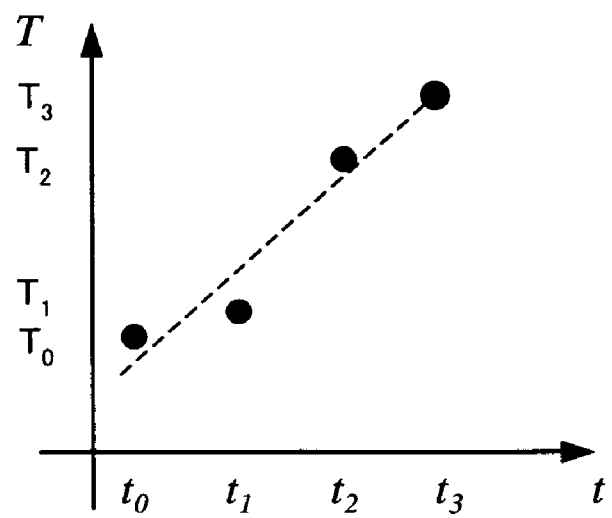
FIG. 14 is a view showing a principle of a current position estimation using least mean square method.

Predicting the present value means obtaining the torque value $T_3$ at a present time point $t_3$ from the torque values $T_0$, $T_1$, and $T_2$ at a time of the past time points $t_0$, $t_1$, and $t_2$ in FIG. 14.

$$T = a \cdot t + b \qquad \text{[Expression 5]}$$

In this case, in order to obtain the coefficients a and b, it is preferable to resolve the simultaneous equations presented by the following expression 6.

$$\begin{pmatrix} \Sigma t_i^2 & \Sigma t_i \\ \Sigma t_i & \Sigma 1 \end{pmatrix} \begin{pmatrix} a \\ b \end{pmatrix} = \begin{pmatrix} \Sigma t_i T_i \\ \Sigma T_i \end{pmatrix} \qquad \text{[Expression 6]}$$

Accordingly, in the case of three past samples, the following expression 7 is obtained by utilizing an inverse matrix example.

$$T_3 = a t_3 + b = (t_3 \;\; 1) \begin{pmatrix} \Sigma t_i^2 & \Sigma t_i \\ \Sigma t_i & \Sigma 1 \end{pmatrix}^{-1} \begin{pmatrix} \Sigma t_i T_i \\ \Sigma T_i \end{pmatrix} \qquad \text{[Expression 7]}$$

In the actual calculation, the inverse matrix can be previously calculated. As a result, each of the coefficients is expressed by the following expression 8.

$$T = \left( 1.0 \;\; -\frac{2}{3} \right) \begin{pmatrix} \Sigma t_i T_i \\ \Sigma T_i \end{pmatrix} \qquad \text{[Expression 8]}$$

$$cf \cdot \begin{cases} \Sigma t_i T = T_1 + 2T_2 \\ \Sigma T_i = T_0 + T_1 + T_2 \end{cases}$$

Either in least mean square method or in the method employing the expression of degree n, since a conclusively calculating form of the substitute torque value corresponds to a sum of products between the coefficients and the past torque values such as the expression $T = a \cdot T_1 + b \cdot T_2 + c \cdot T_3 + d \cdot T_4$, a burden of calculation is not much for the CPU.

Next, a description will be given of the weighted average method. The weighted average method weights the torque values shown in FIG. 13 alphabetically from the past torque value. For example, on the assumption that the torque values are constituted by $T_1$, $T_2$, $T_3$, $T_4$ and $T_5$ in older order, and the weights are constituted, for example, by a, b, c, d and e, the substitute torque value T is determined by the following expression 9.

$$T = (a \cdot T_1 + b \cdot T_2 + c \cdot T_3 + d \cdot T_4 + e \cdot T_5)/(a+b+c+d+e) \qquad \text{[Expression 9]}$$

In this case, on the assumption that the weights a, b, c, d and e are set, for example, to 8, 4, 2, 1 and 1, the expression 9 is rewritten by the following expression 10.

$$T = (8T_1 + 4T_2 + 2T_3 + T_4 + T_5)/16 \qquad \text{[Expression 10]}$$

In accordance with the embodiment described above, in the case that the torque value corresponding to the output of the torque sensor becomes abnormal, the motor of the electric power steering device is immediately controlled by using the correctly predicted substitute torque value in place of the abnormal torque value. Accordingly, it is possible to correctly control the electric power steering device without existence of only one cycle in the abnormality of the steering assist force. Further, in accordance with the present embodiment, since the abnormality of the steering assist force does not exist for only one cycle, it is possible to prevent an erroneous detection with no problem even if a time for confirming the determination that the torque sensor or the like is out of order is set long.

In the conventional control method, since the control is executed by using the abnormal torque value until the output abnormality of the torque sensor is detected, the steering assist force becomes abnormal. Alternatively, since the setting of the substitute torque value does not corresponds to the value correctly predicting the present value, there exists the problem that the steering assist force becomes abnormal. Further, since the steering assist force becomes abnormal, it is impossible to elongate the determining time until confirming that the torque sensor or the like is out of order, and there exists a trouble that the erroneous detection of the torque sensor fault is caused. However, in accordance with the present invention, it is possible to solve the conventional problems.

Next, a description will be given of a second embodiment which can safely switch the output value of the torque sensor and the substitute torque value used at the abnormal time even in the case that a plurality of torque abnormality detecting means exist.

Figure 15:
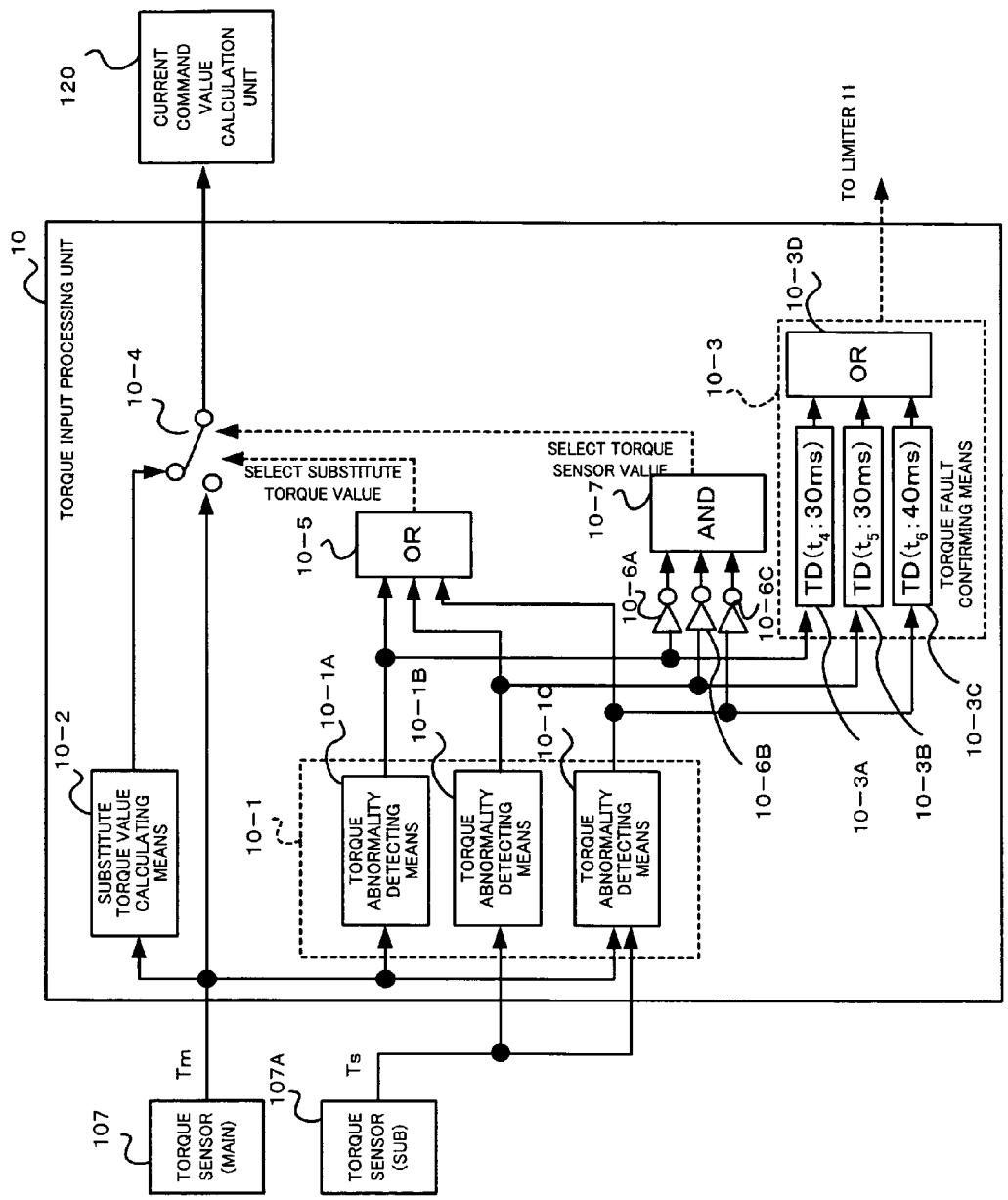
FIG. 15 is a control block diagram showing a second embodiment in accordance with the present invention provided with a plurality of torque abnormality detecting means.

A description will be given of a control or an substitute torque value in the case that a plurality of torque abnormality detecting means exist with reference to FIG. 15. A control block view in FIG. 15 is different from the control block view in FIG. 7 in a point that the construction of the torque input processing unit 10 and a torque sensor 107A provided in addition to the torque sensor 107. In other words, in the present embodiment, the torque sensor is constructed by a double system comprising the main torque sensor 107 and the sub torque sensor 107A.

First, a description will be given of an example in which the torque abnormality detecting means is constituted, for example, by three kinds of torque abnormality detecting means 10-1A, 10-1B and 10-1C. The torque abnormality detecting means 10-1A is constructed such as to detect whether the value of the main torque sensor 107 is normal or abnormal. In accordance with a detection principle thereof, since a torque value Tm corresponding to an output thereof outputs a value between 0.5V and 4.5V in the case that the main torque sensor 107 is normal, the output between 0V and 0.5V or between 4.5V and 5V is deemed to be abnormal. In this case, the voltage of the control power source in this case is between 0V and 5V, and the value of the torque value Tm corresponds to one set example of the torque sensor (107, 107A). In the same manner, the torque abnormality detecting means 10-1B is constructed such as to detect whether the torque value Ts corresponding to the output of the sub torque sensor 107A is normal or abnormal. In accordance with a detection principle thereof, since an output value thereof outputs a value between 0.5V and 4.5V in the case that the sub torque sensor 107A is normal, the output between 0V and 0.5V or between 4.5V and 5V is deemed to be abnormal.

Further, since the torque value Tm corresponding to the output of the main torque sensor 107 and the torque value Ts corresponding to the output value of the sub torque sensor 107A originally indicate an identical value, the torque abnormality detecting means 10-1C is constructed such as to determine to be abnormal if a deviation $\Delta Tr=|Tm-Ts|$ between both the torque values is equal to or more than a predetermined value. As a method of detecting the abnormality by using the torque value Tm and the torque value Ts, there is an abnormality detecting method utilizing a property that a expression Tm+Ts=fixed value or Tm−Ts=fixed value is established if the torque value Tm and the torque value Ts are normal and the like, and it is possible to employ these methods.

A time for determining the abnormality is one cycle of an operation by the CPU, and the determination is executed, for example, about 1 ms. In this case, the torque abnormality detecting means 10-1A, 10-1B and 10-1C output "1" in the case of being abnormal, and output "0" in the case of being normal, for example.

Further, the selection switch 10-4 is constructed such as to be controlled by an OR unit 10-5 and an AND unit 10-7. In the case that the OR unit 10-5 outputs "1", that is, at least one of the torque abnormality detecting means 10-1A, 10-1B and 10-1C determines the abnormality, the selection switch 10-4 selects the substitute torque value so as to send the substitute torque value to the current command value calculation unit 120.

On the other hand, in the case that the AND unit 10-7 outputs "1", the selection switch 10-4 selects the torque value Tm corresponding to the detection value of the torque sensor 107. In other words, if all the outputs of the torque abnormality detecting means 10-1A, 10-1B and 10-1C output "0", they are inverted by NOT units 10-6A, 10-6B and 10-6C, whereby all the inputs of the AND unit 10-7 come to "1", and outputs of the AND unit 10-7 come to "1". Accordingly, the selection switch 10-4 selects the torque value Tm. Therefore, the torque value Tm is input to the current command value calculation unit 120.

The control system mentioned above is employed because of the following reason. In the case that the torque value corresponding to the output of the torque sensor is determined to be abnormal by at least one torque abnormality detecting means, it is possible to secure a safety of the control of the electric power steering device by controlling the electric power steering device on the basis of the substitute torque value, and inversely setting the condition for returning the control to the torque value corresponding to the output of the torque sensor from the substitute torque value to a matter that all the torque abnormality detecting means determine to be normal.

In this case, if the abnormality of the torque value runs on over a predetermined time, it is considered that a severe fault is caused in the torque sensor or the like.

A description will be given below of the decision of the determination that the torque sensors 107 and 107A are out of order, with reference to FIG. 15.

In FIG. 15, the fault of the torque sensors 107 and 107A is achieved by the torque fault confirming means 10-3. The torque fault confirming means 10-3 inputs the outputs from a plurality of torque abnormality detecting means 10-1A, 10-1B and 10-1C to delay units (hereinafter, refer to TD) 10-3A, 10-3B and 10-3C respectively, and inputs respective outputs from the TD 10-3A, the TD 10-3B and the TD 10-3C to an OR unit 10-3D, and an output of the OR unit 10-3D forms a determination result of the fault decision. The TD is achieved by a counter or the like in the case that the CPU is employed as the controller.

In the case that the abnormality "1" corresponding to the output of the torque abnormality detecting means 10-1A runs on over a predetermined time t4, for example, 30 ms, the torque fault confirming means 10-3A confirms the determination that the torque sensor is out of order. In the same manner, in the case that the abnormality "1" corresponding to the output of the torque abnormality detecting means 10-1B runs on over a predetermined time t5, for example, 30 ms, the torque fault confirming means 10-3B confirms the determination that the torque sensor is out of order. Further, in the case that the abnormality "1" corresponding to the output of the torque abnormality detecting means 10-1C runs on over a predetermined time t6, for example, 40 ms, the torque fault confirming means 10-3C confirms the determination that the torque sensor is out of order. Further, if any one of the TD 10-3A, 10-3B and 10-3C outputs "1", the OR unit 10-3D outputs "1", and confirms that the torque sensor is out of order. In other words, in the case that a period for which any one of the torque abnormality detecting means 10-1A, 10-1B and 10-1C confirms to be continuously abnormal by itself is over a predetermined time, the determination that the torque sensor is out or order is confirmed. In this case, since the predetermined time of the TD is different with respect to the abnormality detecting principle of the torque sensor, the predetermined times t4, t5, and t6 of the TD 10-3A, 10-3B and 10-3C may be different from each other.

In this case, in the case mentioned above, the condition for confirming the determination that the torque sensor is out of order is set to the case that the time for which the torque abnormality detecting means determines to be abnormal runs on for the fixed time, however, there is a phenomenon that it is necessary to determine that the torque sensor is out of order, in addition thereto. A description will be given of the phenomenon with reference to FIG. 16.

The torque abnormality detecting means 10-1A determines the abnormality of the torque value Tm of the main torque sensor 107. In accordance with a detection principle thereof, the output between 0.5V and 4.5V is determined to be normal, and the output between 0V and 0.5V or between 4.5V and 5V is determined to be abnormal. Further, the torque abnormality detecting means 10-1C determines to be abnormal if the deviation ΔTr=|Tm−Ts| between the output value Tm of the main torque sensor 107 and the output value Ts of the sub torque sensor 107 is equal to or more than the predetermined value.

Figure 16:
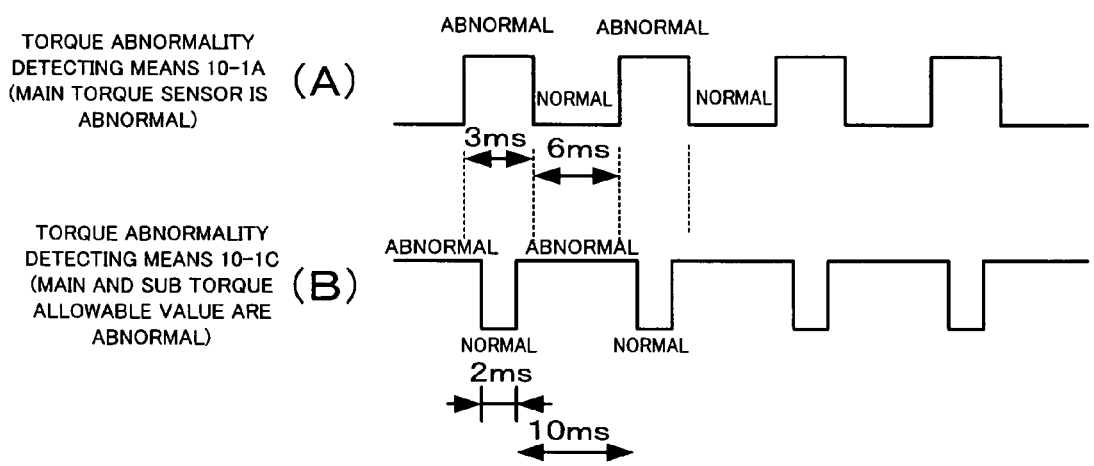
FIG. 16 is a time chart showing an output signal example of each of torque abnormality detecting means in case that the torque sensor is abnormal.

On the basis of the detection principle mentioned above, there is assumed the case that the output cable of the main torque sensor 107 causes a disconnection fault or a connector fault. In the case that the output cable is disconnected, the output value Tm of the torque sensor 107 input to the torque input processing unit 10 generates a hunting phenomenon repeating between 0V and 5V for a very short time by observing the short time such as about 100 ms in the vicinity of the disconnection. One example thereof is shown in FIG. 16. The torque abnormality detecting means 10-1A takes an output as shown in FIG. 16A in accordance with the determination standard that a range between 0V and 0.5V is abnormal, a range between 0.5V and 4.5V is normal and a range between 4.5V and 5V is abnormal, due to the chattering that the torque value Tm rises and falls between 0V and 5V.

On the other hand, for example, in the case that the sub torque sensor 107A indicates 2.5V corresponding to a neutral point of the torque value, the torque abnormality detecting means 10-1C outputs the normality if the torque value Tm of the main torque sensor 107 rises and falls near 2.5V, and outputs the abnormality if it comes close to 0V or 5V. Accordingly, out of the torque abnormality detecting means 10-1C indicates as shown in FIG. 16B, and indicates "1" and "0" signals which are alternate with the "1" and "0" signals in FIG. 16A. Further, if an allowable value with respect to the deviation ΔTr is large, the torque abnormality detecting means 10-1C becomes abnormal from normal before the torque abnormality detecting means 10-1A is normally switched to normal from abnormal as shown in FIG. 16, all the torque abnormality detecting means 10-1A, 10-1B and 10-1C are not normal for a long time, for example, for about 50 ms, and the substitute torque value control is carried over for a long time 50 ms.

Replacing the phenomenon to the operation of steering wheel, it means that the control on the basis of the substitute torque value at a time of turning the steering wheel to the left during a high speed running is carried over, and the assist is carried over while keeping the left ward direction, in case that it is necessary to turn the steering wheel to the right. This is an undesirable phenomenon. Accordingly, it is necessary to determine the torque sensor fault so as to switch to a next best control system such as a manual operation or the like.

Figure 17:
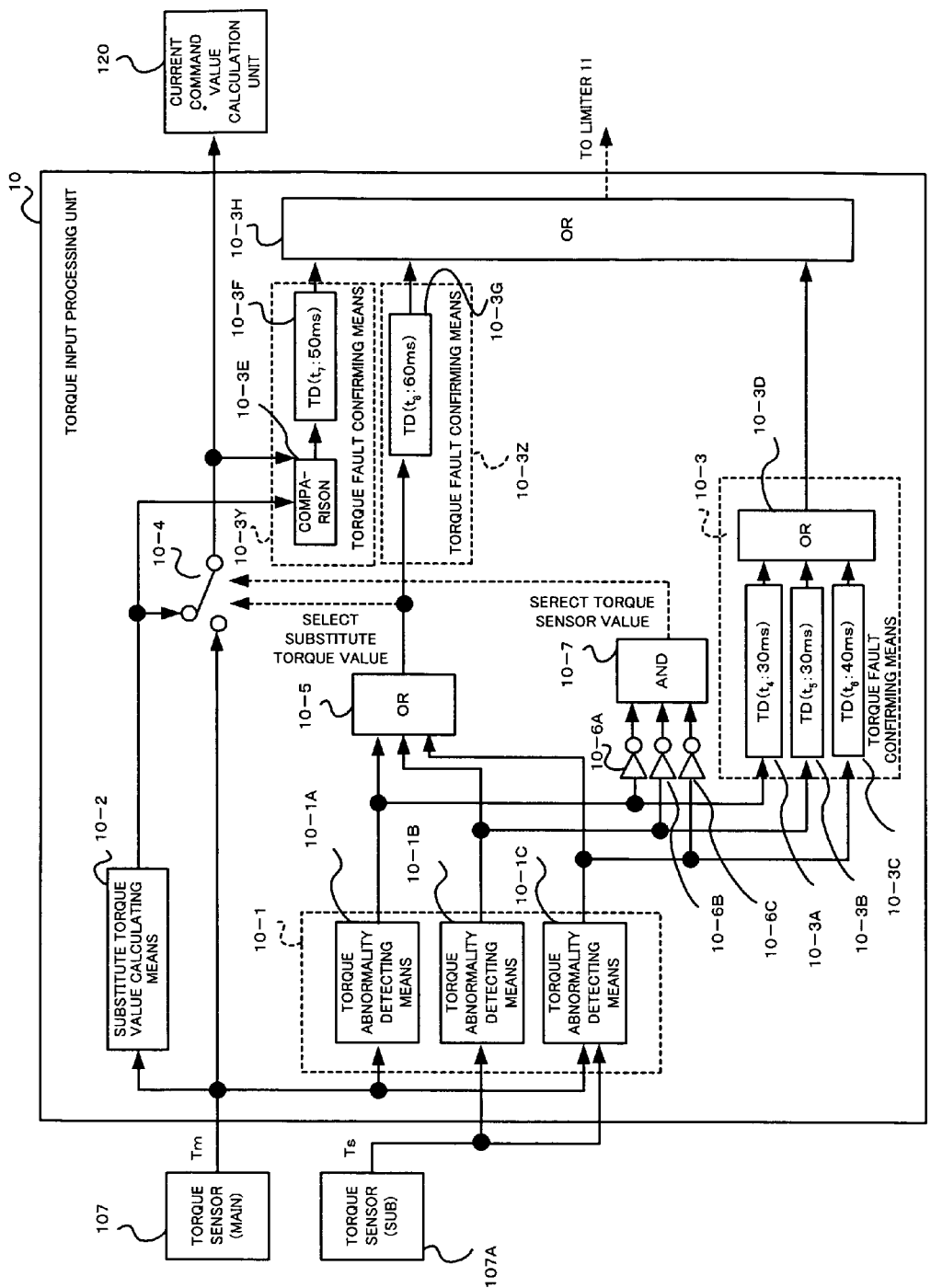
FIG. 17 is a control block diagram showing an example of an apparatus provided with a torque sensor fault detecting means using an substitute torque value control in accordance with the present invention.

A description will be given of a torque fault confirming means for corresponding to the phenomenon mentioned above with reference to FIG. 17. A torque fault confirming means 10-3Y and a torque fault confirming means 10-3Z are added to the torque input processing unit 10, with respect to FIG. 15.

First, a description will be given of the torque fault confirming means 10-3Y constructed by a comparison unit 103E and the TD 10-3F. The torque fault confirming means 103Y compares the input value to the current command value calculation unit 120 and the substitute torque value corresponding to the output of the substitute torque value calculating means 10-2 by the comparison unit 10-3E, and determines whether or not the substitute torque value is updated. Further, if the comparison result of the comparison unit 10-3E is input to the TD 10-3F, and the substitute torque value is not updated even over a predetermined time t7 set by the TD 10-3F sets, for example, 50 ms, the determination that the torque sensor is out of order is confirmed.

Next, a description will be given of the torque fault confirming means 10-3Z constructed by the TD 10-3G. In the case that the output of the OR unit 10-5 corresponding to the command of the substitute torque value selection is input to the TD 10-3G, and the period for continuously selecting the substitute torque value runs on over a predetermined time t8 set by the TD 10-3G, for example, 60 ms, the determination that the torque sensor is out of order is confirmed. In other words, the torque fault confirming means 10-3Z determines that the torque sensor is out of order in the case that the substitute torque value control runs on for a long time. A difference between the torque fault confirming means 10-3G and the torque fault confirming means 10-3 is as follows. If the period for which anyone of the torque abnormality detecting means 10-1A, 10-1B and 10-1C is abnormal by itself runs on over the predetermined time, the torque fault confirming means 10-3 confirms the determination that the torque sensor is out of order. On the contrary, the torque fault confirming means 10-3Z can detect the fault of the torque sensor in which the period of the abnormality by itself in the torque abnormality detecting means 10-1A, 10-1B and 10-1C is short such as the abnormality in the chattering state, however, the abnormality of the combination thereof runs on for a long time.

In this case, the OR unit 10-3H is constructed such as to put together the fault detection result of all the torque sensors, and the fault determination results of the torque fault confirming means 10-3, and the torque fault confirming means 10-3F and 10-3Z are input thereto in the present embodiment.

As mentioned above, it is possible to securely detect a particular fault phenomenon generated in the case that the wiring from the torque sensor is disconnected or the like, the substitute torque value control in place of the torque value from the torque sensor does not run on for a long time, and it is possible to control the electric power steering device on the basis of the safety control to the manual control in the case of the torque sensor is out of order.

The description is given above of the case that the substitute torque value control is executed, however, a description will be given of an embodiment in the case that the substitute torque value control is not executed, with reference to FIG. 18.

The fault of the torque sensor is generated even if the substitute torque value control is not executed, and it is necessary to securely detect the fault of the torque sensor. However, conventionally, in the case that the abnormality of the torque fault confirming means 10-3 in FIG. 18, that is, the torque fault confirming means using the TD 10-3A, 10-3B and 10-3C by itself runs on for a long time, for example, in the case that it runs on for the time T1 or more, the determination that the torque sensor is out of order is confirmed. However, it is conventionally impossible to detect the abnormality that the period for which the torque abnormality detecting means is abnormal by itself is short such as the chattering in a plurality of torque abnormality detecting means 10-1A, 10-1B and 10-1C described with reference to FIG. 16, however, the period of the abnormality runs on for a long time, in the combination of the torque abnormality detecting means 10-1A, 10-1B and 10-1C.

Figure 18:
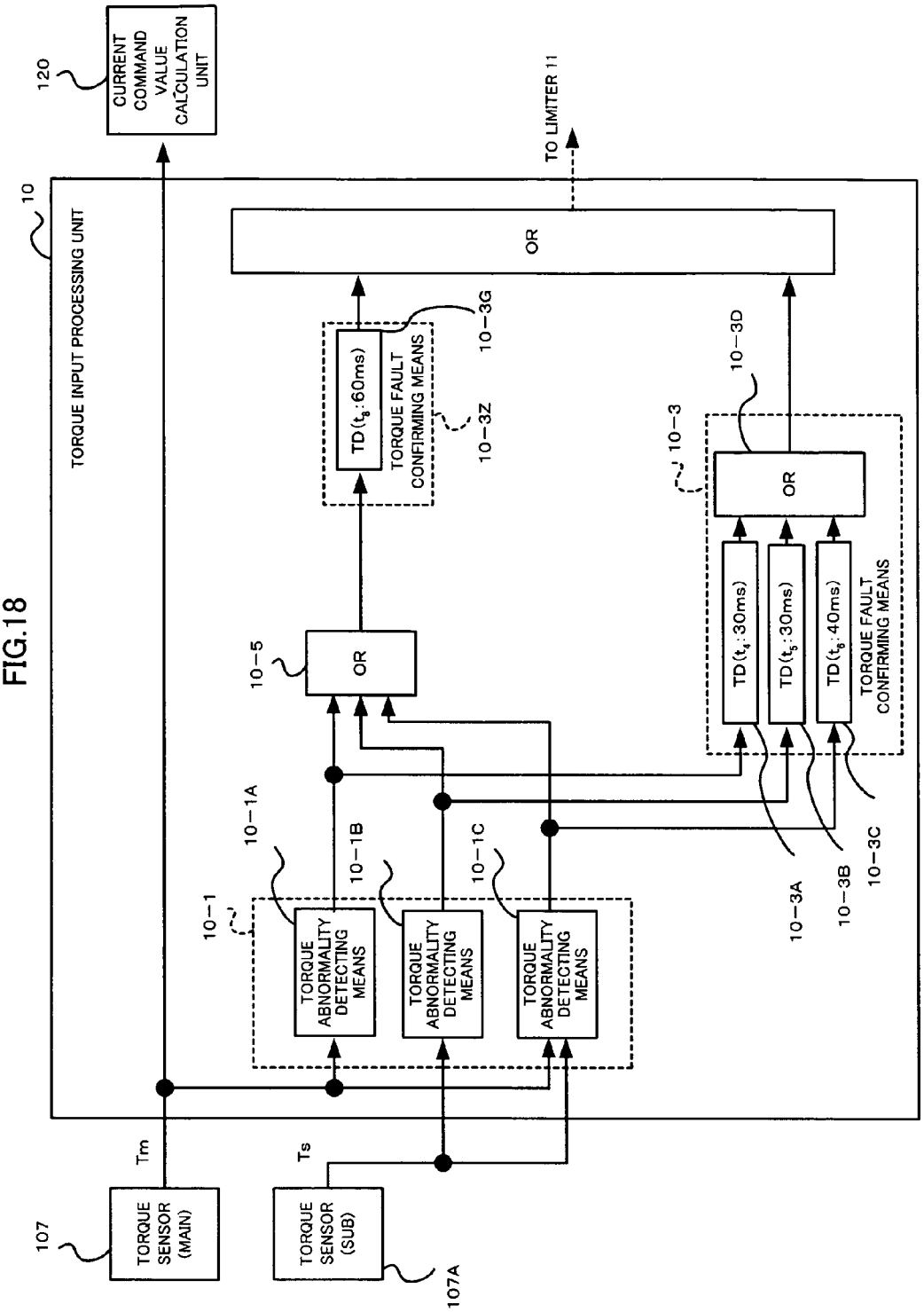
FIG. 18 is a control block diagram showing an example of an apparatus provided with a torque sensor fault detecting means which does not use the substitute torque value control in accordance with the present invention.

However, as shown in FIG. 18, it is possible to obtain an effect of securely detecting the abnormality that the period of the abnormality by itself in a plurality of torque abnormality detecting means is short such as the chattering, however, the period of the abnormality in the combination of the torque abnormality detecting means 10-1A, 10-1B and 10-1C runs on for a long time, for example, for the predetermined time t8 or more, and defining as the fault of the torque sensor, by combining the torque abnormality detecting means 10-1A, 10-1B and 10-1C, the OR unit 10-5 and the TD 10-3G.

Accordingly, it is possible to securely detect the abnormality that the abnormality that the period of the abnormality by itself in a plurality of torque abnormality detecting means is short such as the chattering, however, the period of the abnormality in the combination of a plurality of torque abnormality detecting means runs on for a long time, in other words, the abnormality that the period for determining that at least one of a plurality of torque abnormality detecting means is abnormal runs on for the predetermined time or more, regardless of the alternate value control, and it is possible to decide the abnormality as the fault of the torque sensor. Further, it is possible to provide the controller of the electric power steering device which can perform a operation of steering wheel having a good feeling by executing the control corresponding to the fault.

Next, a description will be given of a third embodiment which can precisely predict the substitute torque value used for the control during the abnormal period of the torque sensor.

Figure 19:
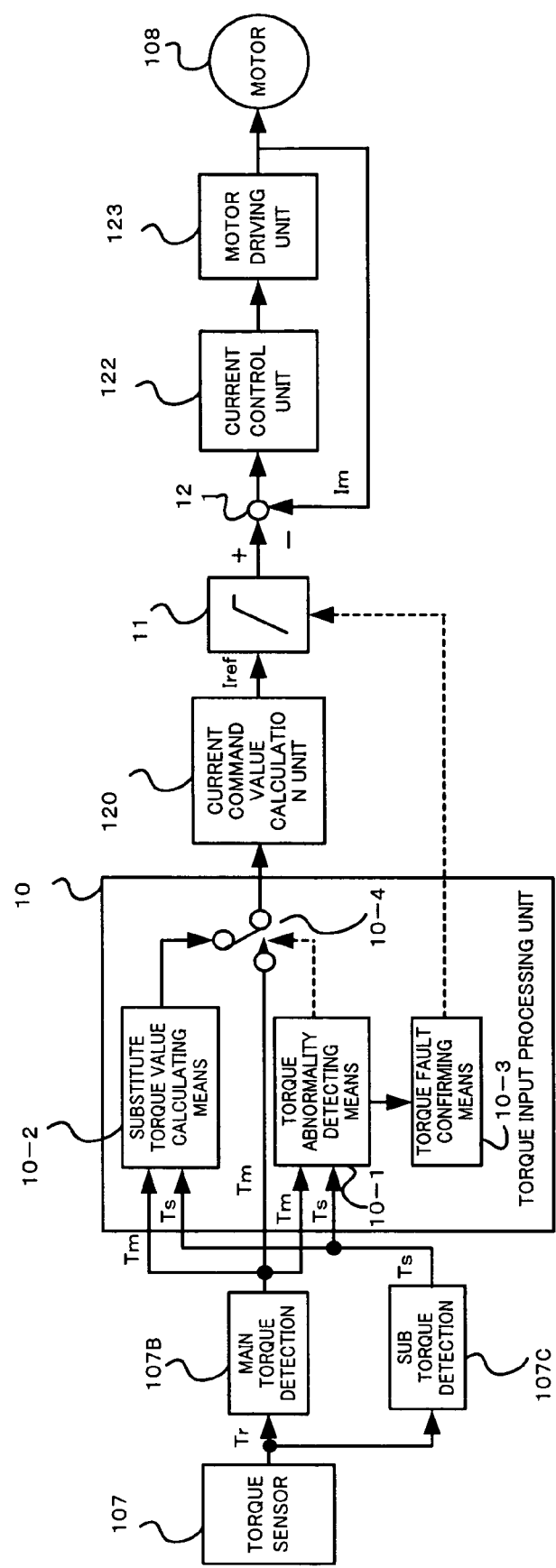
FIG. 19 is a control block diagram showing a third embodiment in accordance with the present invention.

FIG. 19 is a control block diagram showing a third embodiment in accordance with the present invention. A sensor signal Tr detected by the torque sensor 107 is input to a main torque detection unit 107B corresponding to a main torque detecting means and a sub torque detection unit 107C corresponding to a sub torque detection means. The main torque detection unit 107B and the sub torque detection unit 107C are constructed such as to detect the torque value of the steering wheel 101 from the sensor signal Tr output from the torque sensor 107, and are constructed by an electronic circuit such as an operational amplifier or the like, a software process and the like. The main torque detection value Tm is output from the main torque detection unit 107B, and the sub torque detection value Ts is output from the sub torque detection unit 107C. A double system relating to the torque detection is constructed by the main torque detection unit 107B and the sub torque detection unit 107C. In this case, one torque sensor 107 is used in common in the present embodiment, however, the double system may be constructed from the torque sensor stage by preparing two torque sensors for the main torque detection value and for the sub torque detection.

The main torque detection value Tm output from the main torque detection unit 107B and the sub torque detection value Ts output from the sub torque detection unit 107C are respectively input to the torque input processing unit 10. Since details of the torque input processing unit 10 will be described later in detail, a description will be first given of a portion relating to the motor control in the rear stage. The torque value T corresponding to the output of the torque input processing unit 10 is input to the current command value calculation unit 120, and the current command value Iref is calculated in the current command value calculation unit 120. The current command value Iref is input to the subtraction unit 121 via the limiter 11 controlled by the torque input processing unit 10. In the subtraction unit 121, the deviation between the current command value Iref and the detection value Im of the motor current is calculated. The deviation is input to the current control unit 122 constructed by a proportional integral or the like, and the current control unit 122 outputs the duty ratio of the PWM control of the inverter corresponding to one example of the motor driving unit 123. The motor driving unit 123 supplies the motor current on the basis of the PWM control in accordance with the duty ratio to the motor 108, and the motor 108 outputs the torque in correspondence to the torque value instructed by the steering wheel.

The description is given above of the basic portion of the motor control in accordance with the present embodiment, however, a description will be next given of the torque input processing unit 10 corresponding to a main portion of the present embodiment.

The main torque detection value Tm from the main torque detection value 107B and the sub torque detection value Ts from the sub torque detection unit 107C are input to the torque input processing unit 10. The torque input processing unit 10 is provided with the torque abnormality detecting means 10-1 and the substitute torque value calculating means 10-2 in which the main torque detection value Tm and the sub torque detection value Ts are set to the input. The torque abnormality detecting means 10-1 has a function of detecting the abnormality in the torque sensor 107, the main torque detection unit 107B or the sub torque detection unit 107C. The substitute torque value calculating means 10-2 calculates the substitute torque value Ta of the torque used in place of the main torque detection value Tm in the case that the torque sensor 107, the main torque detection unit 107B or the sub torque detection unit 107C is abnormal, by using the main torque detection value Tm and the sub torque detection value Ts.

The torque input processing unit 10 is further provided with the torque fault confirming means 10-3 and the selection switch 10-4. The selection switch 10-4 selects any one of the substitute torque value Ta corresponding to the output of the substitute torque value calculating means 10-2 and the main torque detection value Tm corresponding to the output of the main torque detection unit 107B, on the basis of the output of the torque abnormality detecting means 10-1. Further, the torque fault confirming means 10-3 has a function of confirming the determination that the torque sensor 107, the main torque detection unit 107B or the sub torque detection potion 107C is out of order in the case that the abnormal state runs on over a predetermined time, by using the abnormality detection signal from the torque abnormality detecting means 10-1, and controls the limit value of the limiter 11 if the fault is confirmed.

Figure 20:
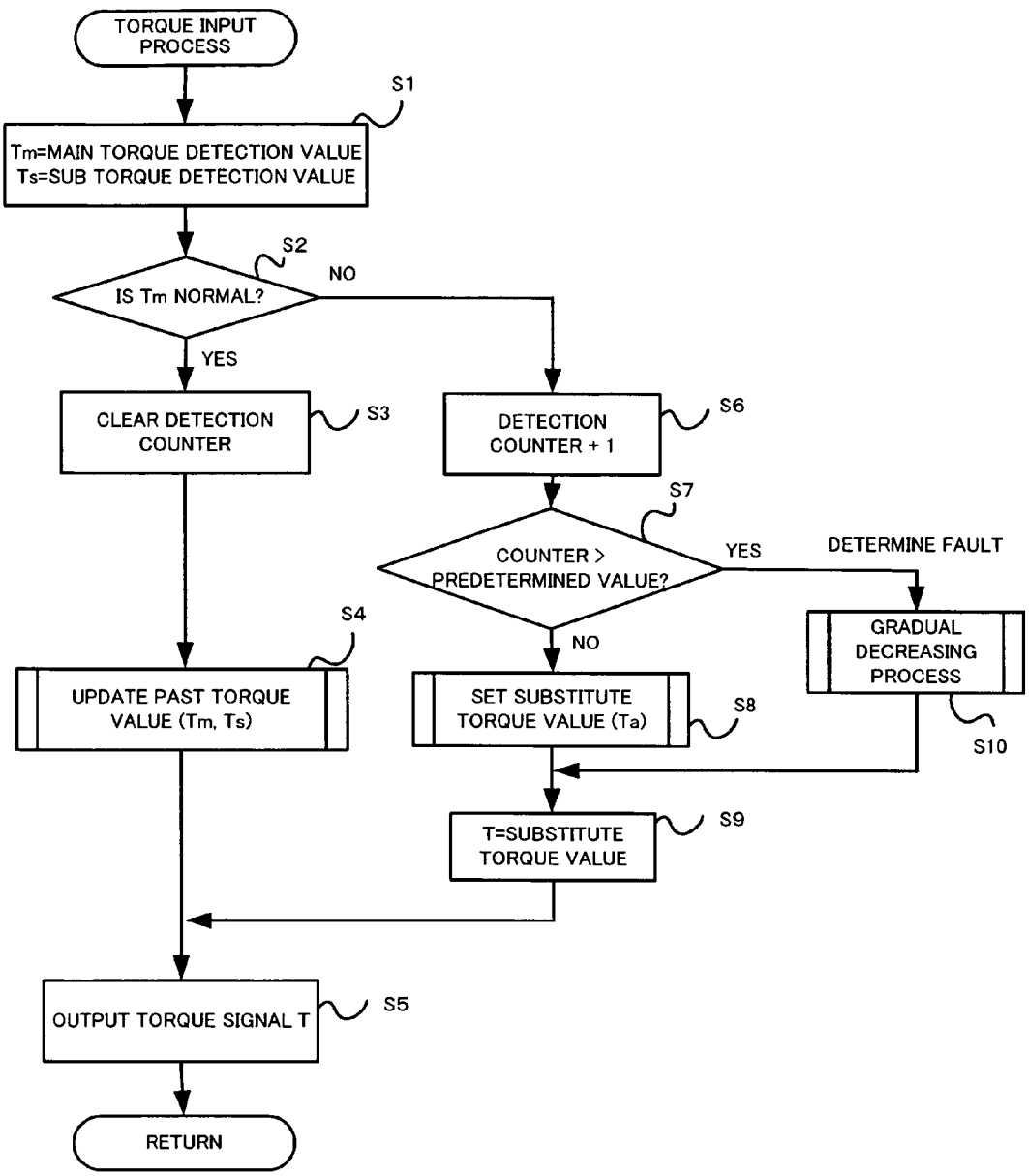
FIG. 20 is a flowchart showing an example of an operation of a torque input processing unit.

Next, a description will be given of an example of an operation of the torque input processing unit 10 with reference to a flow chart in FIG. 20.

For example, since a normal value of the main torque detection value Tm is equal to or more than 0.5V and equal to or less than 4.5V, the output of 0V or 5V means that the main torque detection value Tm is abnormal. Further, in the case that the abnormal state runs on over a predetermined time, for example, 30 ms, the fault of the main torque detection value Tm is confirmed. The flow chart in FIG. 20 is an example showing an operation of an substitute torque value control, a torque abnormality detection and a torque fault decision in the case of the torque abnormality and the torque fault decision mentioned above.

First, the main torque detection value Tm and the sub torque detection value Ts are read respectively from the main torque detection unit 107B and the sub torque detection unit 107C (step S1), and the step determines whether the main torque detection value Tm is equal to or less than 0.5V or equal to or more than 4.5V, determines to be normal (YES) if it is between 0.5V and 4.5V, and determines to be abnormal (NO) if it is equal to or less than 0.5V or equal to or more than 4.5V (step S2). If the main torque detection value Tm is normal, the detection counter is cleared (step S3). The detection counter is constructed such as to measure an abnormality duration used for confirming the determination that the torque sensor 107 outputting the main torque detection value Tm and the main torque detection unit 107B are out of order, and confirms the fault in the case that the abnormality of the main torque detection value Tm runs on over 30 ms.

Figure 21:
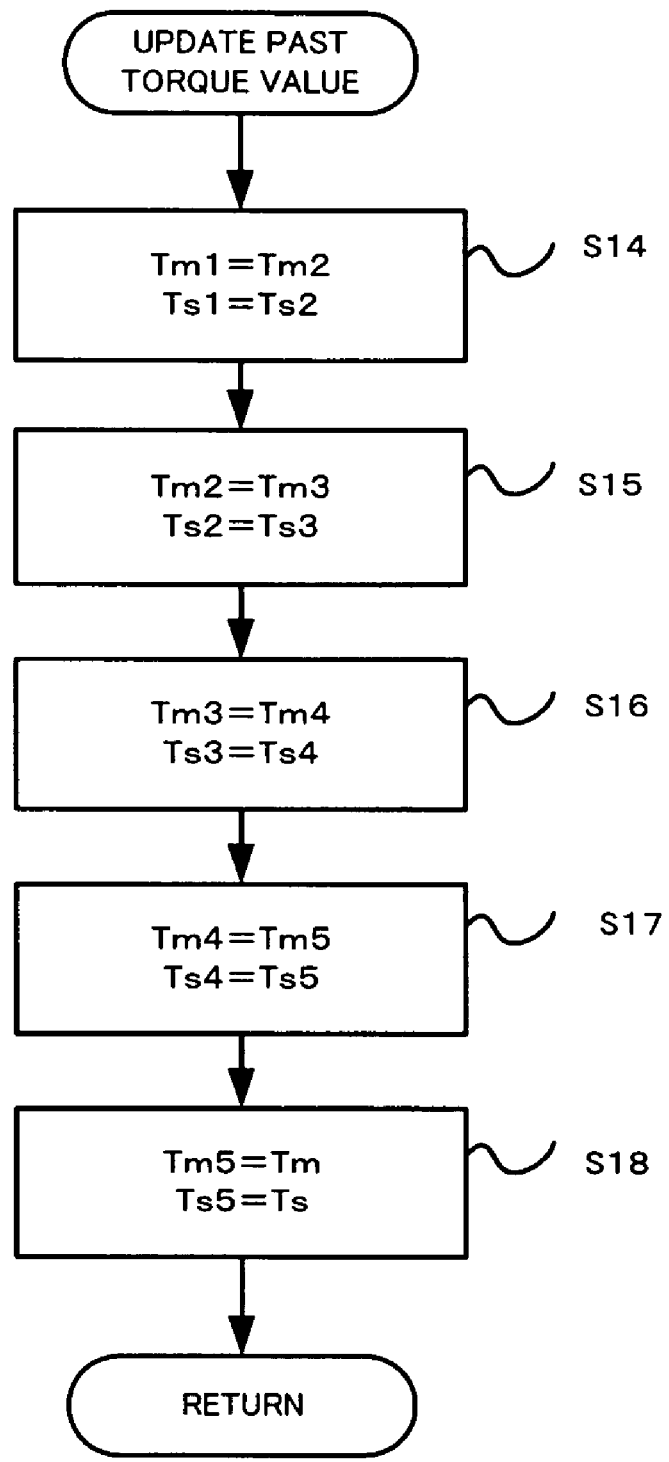
FIG. 21 is a flowchart showing an example of an updating operation of a past main torque detection value Tm and a past sub torque detection value Ts.

After clearing the detection counter, the past main torque value Tm and the past sub torque detection value Ts are updated so as to be stored (step S4). A flow chart of the updating of the past torque value is shown in FIG. 21, however, a description thereof will be given later. After updating the past torque value, the main torque detection value Tm is used as the torque value T used for the motor control (step S6). In other words, the selection switch 10-4 selects and outputs the main torque detection value Tm.

On the other hand, if it is determined in the step S2 mentioned above that the main torque detection value Tm is abnormal, the detection counter is counted up at one time (step S6), and the step determines whether or not the detection counter gets over a predetermined value of the count corresponding to a predetermined value of a time for confirming the determination that the torque sensor 107 and the main torque detection unit 107A are out of order (step S7).

Further, the substitute torque value control is executed without confirming that the torque sensor or the like is out of order during the period that the abnormality duration is equal to or less than the predetermined value (NO). The substitute torque value control is constructed such as to execute the control of the motor 108 by using the substitute torque value Ta in place of the abnormal main torque detection value Tm detected by the torque sensor 107, and calculates the substitute torque value Ta in which the motor control does not become abnormal (step S8). A description will be given later of an example of a method of calculating the substitute torque value Ta with reference to a flow chart in FIG. 22. If the substitute torque value Ta is set, the substitute torque value Ta is input as the output of the torque input processing unit 10 to the torque value T (step S9), and the substitute torque Ta is output as the torque value T (step S5).

On the other hand, in the case that the abnormal time runs on for a predetermined time or more in the step S7 mentioned above (YES), that is, in the case that the count of the detection counter is over the predetermined value (YES), the step confirms the fault, and executes a gradual decreasing process of narrowing down the torque value used in the limiter 11 (step S10).

Next, a description will be given of the updating of the past main torque detection value Tm and the sub torque detection value Ts in the step S4 mentioned above with reference to a flow chart in FIG. 21.

An example in FIG. 21 corresponds to an embodiment in the case of calculating the substitute torque value Ta by using five past torque values. First, the past main torque value Tm2 and the sub torque detection value Ts2 which are newer at one step are substituted respectively for the main torque detection value Tm1 and the sub torque detection value Ts1 (step S14). In the same manner, the past main torque value Tm3 and the sub torque detection value Ts3 which are newer at one step are substituted respectively for the main torque detection value Tm2 and the sub torque detection value Ts2 (step S15), and the past main torque value Tm4 and the sub torque detection value Ts4 which are newer at one step are substituted respectively for the main torque detection value Tm3 and the sub torque detection value Ts3 (step S16). Further, the past main torque value Tm5 and the sub torque detection value Ts5 which are newer at one step are substituted respectively for the main torque detection value Tm4 and the sub torque detection value Ts4 (step S17), and the past main torque value Tm2 and the sub torque detection value Ts which are newer at one step are substituted respectively for the main torque detection value Tm5 and the sub torque detection value Ts5 (step S18).

In the case that the current main torque value Tm and sub torque detection value Ts are utilized for calculating the substitute torque value Ta in case that the torque detection value becomes abnormal in the next step, they come to the one-step past torque detection value. Further, if the performances of the CPU, the memory and the like are good, the process can be executed at a high speed, and a memory capacity is sufficient, the substitute torque value Ta can be calculated by using a lot of past torque values equal to or more than five. On the contrary, the substitute torque value Ta may be calculated by using the past torque values equal to or less than five. The number of the past torque values for calculation may be determined in accordance with a relation between a precision of the substitute torque value Ta, and the performance of the CPU and the capacity of the memory.

Next, a description will be given of contents of the substitute torque value setting step (step S8) of calculating the substitute torque value Ta, with reference to a flow chart in FIG. 22.

First, in FIG. 22A, the step calculates a differential amount $\Delta Ti=|Tmi-Tsi|$ in the combination between the main torque detection value Tmi and the sub torque detection amount Tsi of the past torque. For example, there are established expressions $\Delta T1=|Tm1-Ts1|$ and $\Delta T2=|Tm2-Ts2|$ (step S21). Next, the step selects a set (Tmk, Tsk) in which the differential amount $\Delta Ti$ becomes minimum (step S22). In the case that a plurality of sets (Tmk, Tsk) in which the differential amount $\Delta Ti$ becomes minimum exist, the step selects a most recent set (step S23). Thereafter, if the differential amount $\Delta Ti$ is equal to or less than a predetermined value $\Delta Tlimit$ by using the most recent set (Tmk, Tsk) in the set (Tmk, Tsk) in which the differential amount ΔTi becomes minimum, the step selects the main torque detection value Tmk or the sub torque detection value Tsk as the substitute torque value Ta (step S24). The main toque detection value Tmk or the sub torque detection value Tsk of the set (Tmk, Tsk) is selected as the substitute torque value Ta because the differential amount ΔTi equal to or less than the sufficiently small predetermined value ΔTlimit means a matter that the main torque detection value Tmk and the sub torque detection value Tsk detect an approximately identical torque detection value, both the torque detection values are right, and whichever torque detection values may be used as the substitute torque value Ta.

A description will be given of an example of a selecting method of the substitute torque value Ta, with reference to a flow chart in FIG. 22B. First, in FIG. 22B, the step calculates a differential amount ΔTi=|Tmi−Tsi| in the set between the main torque detection value Tmi and the sub torque detection amount Tsi of the past torque (step S21). For example, there are established expressions ΔT1=|Tm1−Ts1| and ΔT2=|Tm2−Ts2|. Next, the step selects a set (Tmk, Tsk) in which the differential amount ΔTi becomes minimum (step S22). In the case that a plurality of sets (Tmk, Tsk) in which the differential amount ΔTi becomes minimum exist, the step selects a most recent set (step S23). Thereafter, the step selects a torque detection value closer to a torque value Tn indicating an intermediate value of the steering wheel by setting the main torque detection value Tmk in the set (Tmk, Tsk) in which the differential amount ΔTi is minimum and most recent to the substitute torque value Ta, or selecting the sub torque detection value Tsk (step S25). In this case, in the case of FIG. 22B, it is more safe to add a condition that the differential amount ΔTi is equal to or less than a predetermined value, which is not necessarily so small as the case in FIG. 22A.

The substitute torque value Ta is calculated for the reason why the main torque detection value Tm and the sub torque detection value Ts are predicted to be originally the identical value if the torque detection value is normal, and the small differential amount is preferable for the substitute torque value Ta. Further, if the differential amount is identical, it is apparent to be preferable to select the most recent torque detection value closer to the current as the substitute torque value used for the current control. Further, with respect to whether the main torque detection value Tm is selected or the sub torque detection value Ts is selected in the selected torque detection values, the many cases indicating the abnormal torque detection value the abnormality are constituted by 0V showing an earth fault or 5V showing a top fault, and the hunting case alternately repeats between 0V and 5V at a high speed. Taking the fact of the fault phenomenon mentioned above into consideration, the torque value Tn indicating the intermediate value of the steering wheel closer to 2.5V corresponding to the intermediate value between 0V and 5V is preferable for the substitute torque value Ta. The value closer to the intermediate value is selected because the value closer to the intermediate value often has a smaller motor current value, and is safer.

In this case, the method of calculating the substitute torque value Ta by using both the torque detection values of the set (Tmk, Tsk) is not limited to the method in FIG. 22A or FIG. 22B mentioned above.

A precision of the substitute torque value calculated from the past torque detection value is further improved in comparison with the case that the torque detection value is one, by executing the substitute torque value control using the past main torque detection value and the past sub torque detection value as mentioned above. Further, in the case of the abnormality such as generating the chattering, it is a rare case that both the main torque detection value Tm and the sub torque detection value Ts generate the chattering, and any one of them is a correct detection value in many cases. Accordingly, it is effective for calculating the correct substitute torque value, to employ two torque detection values comprising the main torque detection value Tm and the sub torque detection value Ts.

Figure 23:
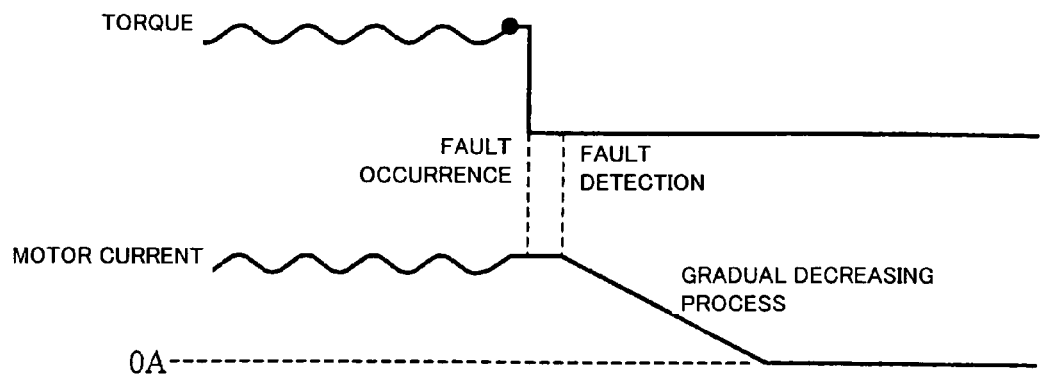
FIG. 23 is a view showing an example of an output result of a motor current in case that a torque sensor is under the earth fault, in the third embodiment in accordance with the present invention.

FIG. 23 shows a relation between the output (the torque value) of the torque sensor and the motor current in the case that the output value of the torque sensor suddenly becomes zero, by using the torque input processing unit 10 in accordance with the present embodiment. Even if the torque value suddenly becomes zero, the motor current maintains the value just before the torque value becomes abnormal because the substitute torque value is immediately used in place of the abnormal torque value. Further, the motor current maintains the proximate value until the torque sensor is confirmed to be out of order, and the motor current attenuates step by step after the torque sensor is confirmed to be out of order. Comparing with FIGS. 4 and 5 showing the results of the conventional control methods, the motor current does not become inverse to the polarity just before the torque value becomes abnormal, and no uncomfortable feeling is applied to the operation of steering wheel.

Figure 6:
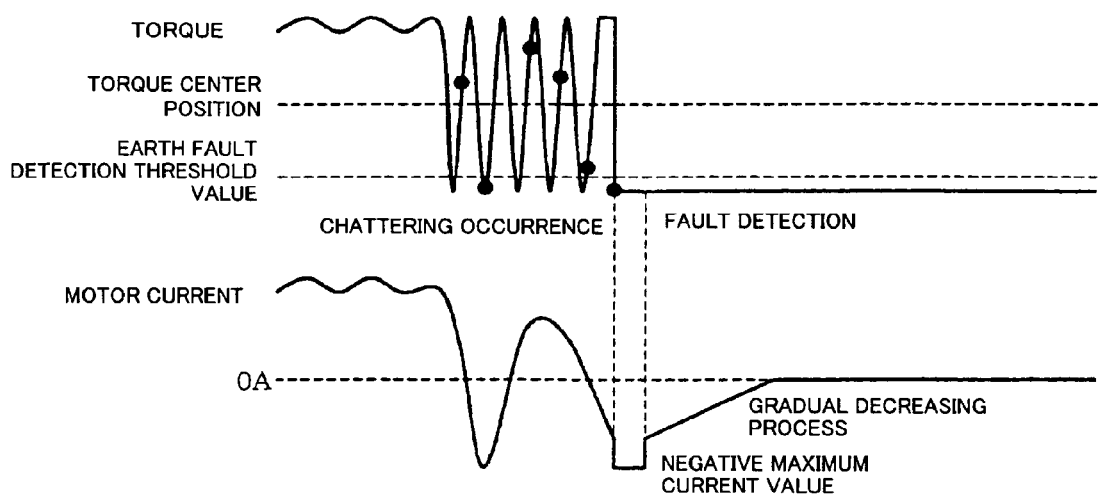
FIG. 6 is a view showing an example of an output result of a motor current at a time of a chattering fault of the torque sensor.
Figure 24:
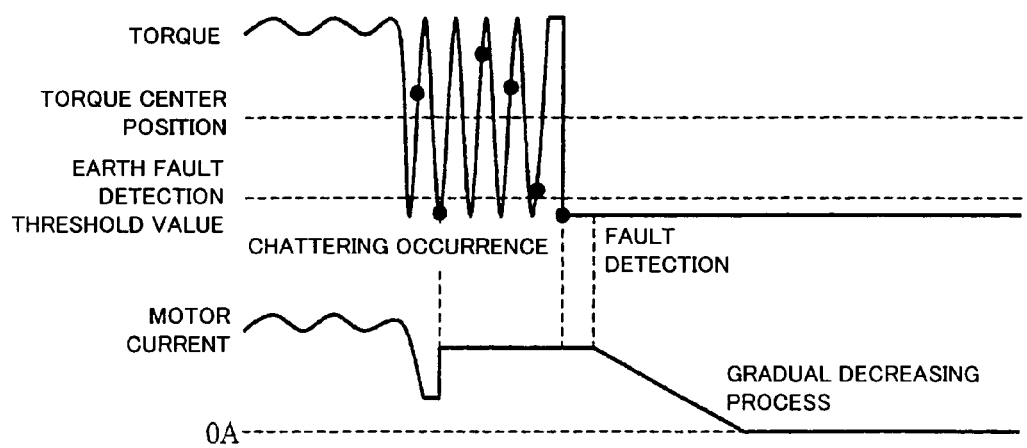
FIG. 24 is a view showing an example of an output result of a motor current at a fault time when the torque sensor causes a chattering fault, in the third embodiment in accordance with the present invention.

Further, FIG. 24 shows a relation between the output (the worst case) of the torque sensor and the motor current in the case of the fault in which the output value of the torque sensor generates the chattering, by using the torque input processing unit 10 in accordance with the present embodiment. If the torque value generates the chattering so as to be determined to be abnormal, the alternate toque value is calculated by using the past normal torque value, and the motor current is controlled on the basis of the substitute torque value. Accordingly, the motor current outputs the current which is not largely different from the motor current just before the chattering is generated. Further, the motor current is attenuated step by step after the fault is detected. The result is compared with FIG. 6 showing the result of the conventional control system. In the case of the conventional control system, the motor current having the inverse polarity to that before the torque sensor becomes abnormal is generated, and is violently fluctuated thereafter, so that the result which is not preferable for the drive is obtained. Further, it is preferable to attenuate the motor current step by step after the fault is detected, however, since the motor current just before the attenuation attenuates from the current having the inverse polarity, it is not preferable. The control system in accordance with the present embodiment forms a control which is apparently preferable for the steering of steering wheel in comparison with the conventional control system, even in the worst case.

As mentioned above, in accordance with the present invention, since the motor control is executed by using the precisely calculated substitute torque value in place of the abnormal torque detection value until the torque sensor and the torque detection unit are confirmed to be out of order, it is possible to achieve the operation of steering wheel having no uncomfortable feeling even if the torque sensor and the torque detection unit become abnormal, and even if the predetermined time until the torque sensor and the torque detection unit are confirmed to be out of order is set so long as to be erroneously detected.

Figure 25:
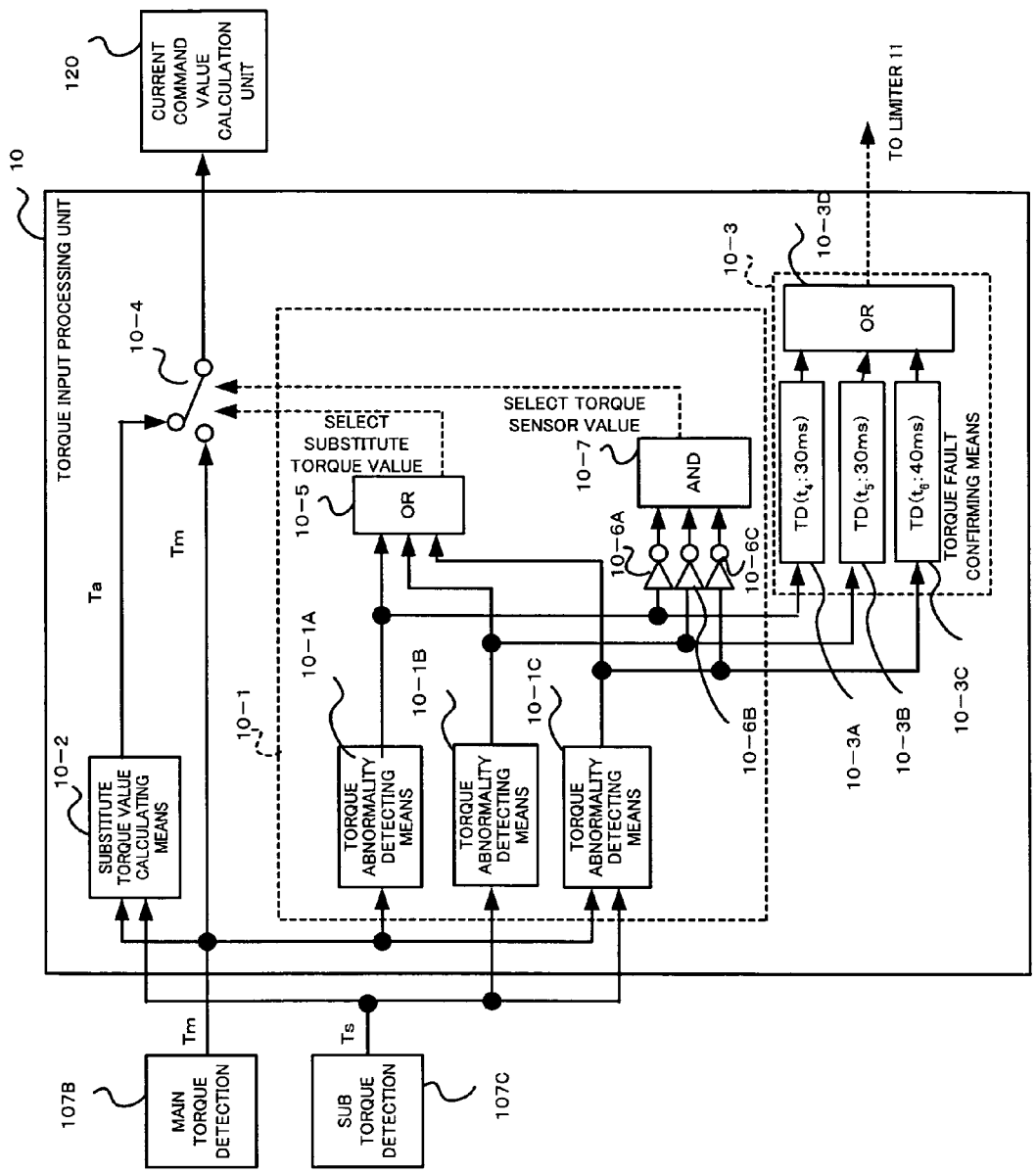
FIG. 25 is a block diagram showing an embodiment of a torque input processing unit in the case of having a plurality of torque abnormality detecting means.

In the embodiment mentioned above, as the example for confirming that the torque sensor and the torque detection unit are abnormal or out of order, there is supposed the case that the main torque detection value Tm is outside the normal range (equal to or more than 0.5 V and equal to or less than 4.5 V), however, there is the other method of detecting the abnormality and confirming the fault which determines that the torque sensor and the torque detection unit are abnormal or out of order. A description will be given of the embodiment mentioned above with reference to FIG. 25.

The different portion from the embodiment mentioned above is a matter that the torque abnormality detecting means 10-1 has a plurality of torque fault abnormality detecting means 10-1A, 10-1B and 10-1C having different detecting principles. Accordingly, the determination for switching the selection switch 10-4 is as follows. In the case that any one of the torque abnormality detecting means 10-1A, 10-1B and 10-1C is abnormal (the output of each of the torque abnormality detecting means in the case of being abnormal is set to "1"), the substitute torque value Ta corresponding to the output of the substitute torque value calculating means 10-2 is selected on the basis of the output of the OR unit 10-5 having the outputs of the torque abnormality detecting means 10-1A, 10-1B and 10-1C as an input. On the contrary, in the case that all of the torque abnormality detecting means 10-1A, 10-1B and 10-1C are not abnormal, that is, all of them are normal (the output of each of the torque abnormality detecting means in the case of being normal is set to "0"), the selection switch 10-4 selects the main torque detection value Tm corresponding to the output of the main torque detection unit 107A on the basis of the output of the AND unit 10-7 having the outputs of the NOT units 10-6A, 10-6B and 10-6C as an input, the NOT units 10-6A, 10-6B and 10-6C respectively having the outputs of the torque abnormality detecting means 10-1A, 10-1B and 10-1C as an input.

In this case, a description will be given of one example of the detection principle of the torque abnormality detecting means 10-1A, 10-1B and 10-1C. The torque abnormality detecting means 10-1A is the same as the torque abnormality detecting means used in the embodiment in FIG. 19, and corresponds to a torque abnormality detecting means for determining the case that the main torque detection value Tm does not exist in the normal range abnormal. The torque abnormality detecting means 10-1B corresponds to a torque abnormality detecting means for determining the case that the sub torque detection value Ts does not exist in the normal range (equal to or more than 0.5V and equal to or less than 4.5V) abnormal. Further, the torque abnormality detecting means 10-1C corresponds to a torque abnormality detecting means for determining the case that the difference between the main torque detection value Ts and the sub torque detection value Ts does not exist in the normal range abnormal, because the main torque detection value Ts and the sub torque detection value Ts originally take the identical value.

Further, the different portion of the torque fault confirming means 10-3 from the embodiment in FIG. 19 is a matter that it is provided with a plurality of delay units (hereinafter, refer to TD unit) 10-3A, 10-3B and 10-3C in accordance that the torque abnormality detecting means 10-1 has a plurality of torque abnormality detecting means 10-1A, 10-1B and 10-1C. In other words, in the case that a state in which the output of the torque abnormality detecting means 10-1A is abnormal runs on over a predetermined time t4, for example, 30 ms, the TD unit 10-3A decides that the torque sensor 107 and the main torque detection unit 107A are out of order. In the same manner, in the case that a state in which the output of the torque abnormality detecting means 10-1B is abnormal runs on over a predetermined time t5, for example, 30 ms, the TD unit 10-3B decides that the torque sensor 107 and the sub torque detection unit 107B are out of order. Further, in the case that a state in which the output of the torque abnormality detecting means 10-1C is abnormal runs on over a predetermined time t6, for example, 30 ms, the TD unit 10-3C decides that the torque sensor 107 and the main torque detection unit 107A or the sub torque detection unit 107B are out of order.

Further, if the torque sensor and the torque detection unit are confirmed to be out of order, on the basis of the output of the OR unit 10-3D having the output ("1" in the case of the fault) of the torque fault confirming means 10-3A, 10-3B and 10-3C as the input, the limiter 11 is controlled, and a gradual decreasing process in which the current command value Iref is narrowed down is executed.

The present embodiment has a plurality of torque abnormality detecting means 10-1A, 10-1B and 10-1C. Accordingly, with respect to a switching reason of the selection switch 10-4, if there is executed a detection that any one of a plurality of torque abnormality detecting means 10-1A, 10-1B and 10-1C is abnormal, the selection switch 10-4 selects the substitute torque value Ta in place of the main torque detection value Tm. On the contrary, if there is output a detection result that all of a plurality of torque abnormality detecting means 10-1A, 10-1B and 10-1C are normal, the selection switch 10-4 selects the main torque detection value Tm.

Figure 22:
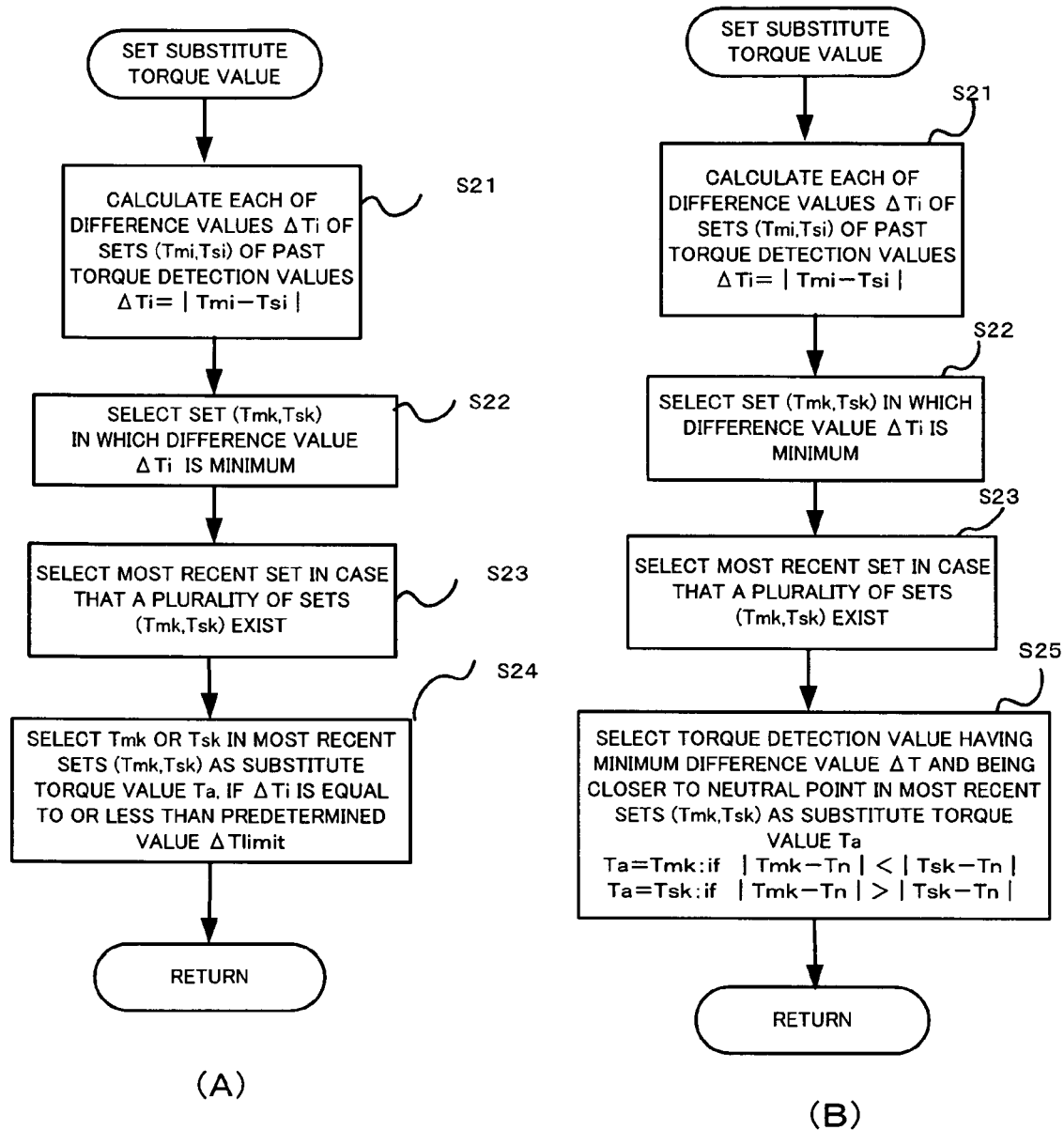
FIG. 22 is a flowchart showing an example of an operation of calculating an substitute torque value from the past main torque detection value Tm and the past sub torque detection value Ts.

On the other hand, the substitute torque value calculating means 10-2 in accordance with the present embodiment is calculated on the basis of an substitute torque value calculating step shown by a flow chart in FIG. 22.

In the case of the double system in which the main torque detection value Tm and the sub torque detection value Ts detect, it goes without saying that a plurality of abnormality detecting means and fault confirming means exist in correspondence to the double system as in the second embodiment. Even if a plurality of abnormality detecting means and fault confirming means exist as mentioned above, no uncomfortable feeling is applied to the operation of steering wheel until the torque sensor and the torque detection unit become abnormal so as to be confirmed to be out of order, on the basis of the substitute torque value using the past main torque detection value Tm and the past sub torque detection value Ts, in the case that the torque sensor and the torque detection unit are abnormal.

As described above, in accordance with the present invention, in the substitute torque value using the past main torque detection value Tm and the past sub torque detection value Ts, any one of them executes the correct torque detection at a high possibility even if any abnormality is generated in the torque detection, and the substitute torque value is calculated by using the correct past torque detection value. Accordingly, in comparison with the substitute torque value which uses only the main torque detection value Tm, it is possible to achieve a operation of steering wheel having no uncomfortable feeling until the torque sensor and the torque detection unit become abnormal so as to be confirmed to be out of order. In particular, in the case of the chattering abnormality generated in case that the wiring relating to the torque detection is disconnected, there is a small possibility that both of the main torque detection value Tm and the sub torque detection value Ts generate the chattering. Accordingly, this construction is particularly effective.

INDUSTRIAL APPLICABILITY

The controller of the electric power steering device in accordance with the present invention is suitable for being used in the electric power steering device which does not apply any uncomfortable feeling to the operation of steering wheel and can secure a safe operation of steering wheel, even in the case that the torque sensor detecting the steering torque of the steering wheel become abnormal.

What is claimed is:

1. A controller of an electric power steering device, which comprises a motor applying a steering assist force to a steering system of a vehicle and at least one torque sensor detecting a steering force applied to a steering wheel, and controlling said motor based on an output value of said torque sensor, characterized in that:

said controller comprises a torque input processing unit comprising at least one torque abnormality detecting means for detecting an abnormality of an output value of said torque sensor and an substitute torque value calculating means for calculating an substitute torque value based on past normal output value of said torque sensor before said output value of said torque sensor becomes abnormal, and a torque fault confirming means for confirming a determination that said torque sensor is out of order in the case that said abnormality of said output value of said torque sensor runs on for a fixed time, said controller controls said motor based of said substitute torque value in place of said output value of said torque sensor in case that said output value of said torque sensor is abnormal, even before confirming said determination that said torque sensor is out of order.

2. A controller of an electric power steering device according to claim 1, wherein said substitute torque value Ts an average value of n (n is a natural number) samples of said output value of said torque sensor just before said output value of said torque sensor becomes abnormal.

3. A controller of an electric power steering device which comprises a motor applying a steering assist force to a steering system of a vehicle and at least one torque sensor detecting a steering force applied to a steering wheel, and controlling said motor based on an output value of said torque sensor, characterized in that:

said controller comprises a torque input processing unit comprising at least one torque abnormality detecting means for detecting an abnormality of an output value of said torque sensor and an substitute torque value calculating means for calculating an substitute torque value based on past normal output value of said torque sensor before said output value of said torque sensor becomes abnormal, and controls said motor based on said substitute torque value in place of said output value of said torque sensor, in case that said output value of said torque sensor is abnormal, wherein said substitute torque value is a weighted average value of n (n is a natural number) samples of said output value of said torque sensor just before said output value of said torque sensor becomes abnormal.

4. A controller of an electric power steering device which comprises a motor applying a steering assist force to a steering system of a vehicle and at least one torque sensor detecting a steering force applied to a steering wheel, and controlling said motor based on an output value of said torque sensor, characterized in that:

said controller comprises a torque input processing unit comprising at least one torque abnormality detecting means for detecting an abnormality of an output value of said torque sensor and an substitute torque value calculating means for calculating an substitute torque value based on past normal output value of said torque sensor before said output value of said torque sensor becomes abnormal, and controls said motor based on said substitute torque value in place of said output value of said torque sensor, in case that said output value of said torque sensor is abnormal, wherein said substitute torque value is a value obtained by using least mean square method from n (n is a natural number) samples of said output value of said torque sensor just before said output value of said torque sensor becomes abnormal.

5. A controller of an electric power steering device which comprises a motor applying a steering assist force to a steering system of a vehicle and at least one torque sensor detecting a steering force applied to a steering wheel, and controlling said motor based on an output value of said torque sensor, characterized in that:

said controller comprises a torque input processing unit comprising at least one torque abnormality detecting means for detecting an abnormality of an output value of said torque sensor and an substitute torque value calculating means for calculating an substitute torque value based on past normal output value of said torque sensor before said output value of said torque sensor becomes abnormal, and controls said motor based on said substitute torque value in place of said output value of said torque sensor, in case that said output value of said torque sensor is abnormal, wherein said substitute torque value is a predicted present value obtained by preparing an expression of degree (n−1) from n (n is a natural number) samples of said output value of said torque sensor just before said output value of said torque sensor becomes abnormal.

6. A controller of an electric power steering device according to claim 1, wherein said controller comprises a plurality of torque abnormality detecting means for detecting an abnormality of said torque sensor based on said output value of said torque sensor, and controls said motor based on said substitute torque value in place of said output value of said torque sensor at a time of determining that any one of said plurality of torque abnormality detecting means is abnormal, and in the case of controlling said motor based on said substitute torque value, controls by using said output value of said torque sensor in place of said substitute torque value at a time of determining that all of said plurality of torque abnormality detecting means are normal.

7. A controller of an electric power steering device according to claim 6, wherein said controller comprises a torque fault confirming means for confirming a determination that said torque sensor is out of order, in case that a period for determining that any one of said plurality of torque abnormality detecting means is continuously out of order by itself is over a predetermined time.

8. A controller of an electric power steering device according to claim 6 or 7, wherein said controller comprises a torque fault confirming means for confirming a determination that said torque sensor is out of order, in case that said substitute torque value is not updated even if it is over a predetermined time.

9. A controller of an electric power steering device according to claim 1, wherein said controller comprises
- a main torque detecting means for detecting a main torque detection value Tm based on said output of said torque sensor;
- a sub torque detecting means for detecting a sub torque detection value Ts based on said output of said torque sensor;
- a torque abnormality detecting means for detecting an abnormality of said main torque detection value Tm or said sub torque detection value Ts;
- and an substitute torque value calculating means for calculating an substitute torque value Ta based on past normal main torque detection value Tm before said main torque detection value Tm or said sub torque detection value Ts becomes abnormal and past normal sub torque detection value Ts before said main torque detection value Tm or said sub torque detection value Ts becomes abnormal,
- and controls said motor based on said substitute torque value Ta in place of said main torque detection value Tm, in case that said main torque detection value Tm or said sub torque detection value Ts is detected to be abnormal.

10. A controller of an electric power steering device according to claim 9, wherein said controller
- comprises a torque fault confirming means for confirming a determination of fault in the case that a state, in which said main torque detection value Tm or said sub torque detection value Ts is abnormal, runs on for a predetermined time,
- and controls said motor based on said substitute torque value Ta in place of said main torque detection value Tm even before said torque fault confirming means confirms said determination of fault, if said torque abnormality detecting means detects that said main torque detection value Tm or said sub torque detection value Ts is abnormal.

11. A controller of an electric power steering device according to claim 9 or 10,
- wherein said substitute torque value Ta is obtained by
- determining a difference between said main torque detection value Tm and said sub torque detection value Ts at a past same timing before said main torque detection value Tm or said sub torque detection value Ts becomes abnormal,
- and calculating said substitute torque value Ta by using said main torque detection value Tm and said sub torque detection value Ts at said past same timing in which said difference value becomes minimum.

12. A controller of an electric power steering device according to claim 11,
- wherein a most recent set (Tm, Ts) is employed in the case that a plurality of sets (Tm, Ts) of said main torque detection value Tm and said sub torque detection value Ts at said past same timing in which said difference value becomes minimum exist.

13. A controller of an electric power steering device according to claim 11,
- wherein said substitute torque value Ta is a torque detection value closer to a torque neutral value by which said steering wheel indicates a neutral point, among said main torque detection value Tm and said sub torque detection value Ts at said past same timing in which said difference value becomes minimum.

14. A controller of an electric power steering device according to claim 11,
- wherein said torque abnormality detecting means detects an abnormality of said torque sensor based on said main torque detection value Tm, or said sub torque detection value Ts, or said main torque detection Tm and said sub torque detection value Ts.

15. A controller of an electric power steering device which comprises a motor applying a steering assist force to a steering system of a vehicle and at least one torque sensor detecting a steering force applied to a steering wheel, and controlling said motor based on an output value of said torque sensor, characterized in that:
- said controller comprises
- a torque input processing unit comprising
- at least one torque abnormality detecting means for detecting an abnormality of an output value of said torque sensor and
- an substitute torque value calculating means for calculating an substitute torque value based on past normal output value of said torque sensor before said output value of said torque sensor becomes abnormal,
- and a torque fault confirming means for confirming a determination that said torque sensor is out of order in the case that said abnormality of said output value of said torque sensor runs on for a fixed time,
- said controller controls said motor based of said substitute torque value in place of said output value of said torque sensor in case that said output value of said torque sensor is abnormal, even before confirming said determination that said torque sensor is out of order,
- wherein said substitute torque value Ts a weighted average value of n (n is a natural number) samples of said output value of said torque sensor just before said output value of said torque sensor becomes abnormal.

16. A controller of an electric power steering device which comprises a motor applying a steering assist force to a steering system of a vehicle and at least one torque sensor detecting a steering force applied to a steering wheel, and controlling said motor based on an output value of said torque sensor, characterized in that:
- said controller comprises
- a torque input processing unit comprising
- at least one torque abnormality detecting means for detecting an abnormality of an output value of said torque sensor and
- an substitute torque value calculating means for calculating an substitute torque value based on past normal output value of said torque sensor before said output value of said torque sensor becomes abnormal,
- and a torque fault confirming means for confirming a determination that said torque sensor is out of order in the case that said abnormality of said output value of said torque sensor runs on for a fixed time,
- said controller controls said motor based of said substitute torque value in place of said output value of said torque sensor in case that said output value of said torque sensor is abnormal, even before confirming said determination that said torque sensor is out of order,
- wherein said substitute torque value Ts a value obtained by using least mean square method from n (n is a natural number) samples of said output value of said torque sensor just before said output value of said torque sensor becomes abnormal.

17. A controller of an electric power steering device which comprises a motor applying a steering assist force to a steering system of a vehicle and at least one torque sensor detecting a steering force applied to a steering wheel, and controlling said motor based on an output value of said torque sensor, characterized in that:

said controller comprises a torque input processing unit comprising at least one torque abnormality detecting means for detecting an abnormality of an output value of said torque sensor and an substitute torque value calculating means for calculating an substitute torque value based on past normal output value of said torque sensor before said output value of said torque sensor becomes abnormal, and a torque fault confirming means for confirming a determination that said torque sensor is out of order in the case that said abnormality of said output value of said torque sensor runs on for a fixed time, said controller controls said motor based of said substitute torque value in place of said output value of said torque sensor in case that said output value of said torque sensor is abnormal, even before confirming said determination that said torque sensor is out of order, wherein said substitute torque value is a predicted present value obtained by preparing an expression of degree (n−1) from n (n is a natural number) samples of said output value of said torque sensor just before said output value of said torque sensor becomes abnormal.

* * * * *